(12) United States Patent  (10) Patent No.: US 7,353,994 B2
Farrall et al.  (45) Date of Patent: Apr. 8, 2008

(54) SECURITY, IDENTIFICATION AND VERIFICATION SYSTEMS

(76) Inventors: Andrew John Farrall, 6 Briar Mead, Yatton, North Somerset (GB) BS49 4RE; Keith Michael Barfoot, Lindis, Whitwell Lane, Colyford, Devon (GB) EX24 6HP ( * ) Notice: Subject to any disclaimer, the term of this patent is extended or adjusted under 35 U.S.C. 154(b) by 467 days.

(21) Appl. No.: 10/451,602

(22) PCT Filed: Dec. 19, 2001

(86) PCT No.: PCT/GB01/05642

§ 371 (c)(1),
(2), (4) Date: Nov. 10, 2003

(87) PCT Pub. No.: WO02/50790

PCT Pub. Date: Jun. 27, 2002

(65) Prior Publication Data

US 2004/0112962 A1  Jun. 17, 2004

(30) Foreign Application Priority Data

Dec. 20, 2000 (GB) ................................. 0031016.9

(51) Int. Cl.
*G06K 7/10* (2006.01)
(52) U.S. Cl. ........................ 235/454; 235/491; 235/494
(58) Field of Classification Search ................ 235/454, 235/462.01, 494, 491
See application file for complete search history.

(56) References Cited

U.S. PATENT DOCUMENTS

| | | | |
|---|---|---|---|
| 3,636,318 A | 1/1972 | Lindstrom et al. | |
| 5,325,167 A | 6/1994 | Melen | |
| 5,434,917 A | 7/1995 | Naccache et al. | |
| 5,565,667 A * | 10/1996 | Takahashi et al. | .......... 235/457 |
| 5,602,381 A | 2/1997 | Hoshino et al. | |
| 6,039,255 A | 3/2000 | Seo | |
| 6,193,156 B1 * | 2/2001 | Han et al. | ................... 235/454 |

FOREIGN PATENT DOCUMENTS

| | | |
|---|---|---|
| EP | 0 161 181 A | 11/1985 |
| EP | 0 626 275 A2 | 11/1994 |
| EP | 0 989 527 A2 | 3/2000 |
| FR | 2 442 719 | 6/1980 |
| GB | 1107341 | 3/1968 |

(Continued)

OTHER PUBLICATIONS

Dr. Zorll et al; "Rommp Lexikon Lacke und Druckfarben" (Published 1998) (8 pages).

(Continued)

*Primary Examiner*—Michael G. Lee
*Assistant Examiner*—Kristy A. Haupt
(74) *Attorney, Agent, or Firm*—Osha Liang LLP

(57) ABSTRACT

A method of operating a security system includes making a plurality of security tags, each of which includes a plurality of particles randomly distributed in a light-transmitting matrix, providing a reader which includes means for causing light of one or more wavelengths to impinge on a security tag and means for interpreting the light reflected and/or refracted and/or diffracted by the particles in the matrix, and presenting said tags to said reader.

14 Claims, 20 Drawing Sheets

Picture 1
Image of
Tag 1

Picture 2
Repeat
image
of Tag 1

Picture 3
Image of
different tag
(Tag 2)

FOREIGN PATENT DOCUMENTS

| | | |
|---|---|---|
| GB | 2 304 077 | 3/1997 |
| GB | 2 304 077 A | 3/1997 |
| GB | 2 324 065 | 10/1998 |
| GB | 2 324 065 A | 10/1998 |
| WO | 91/12146 | 8/1991 |
| WO | 01/5783 A1 | 8/2001 |
| WO | WO 01/57831 A1 | 8/2001 |
| WO | WO 02/50790 A1 | 6/2002 |

OTHER PUBLICATIONS

Concise explanation of relevance for Cite No. AA, AB, AC, AD, AE, BA, BB, BD, BG, BH, BI and CA (2 pages).

* cited by examiner

Figure 1
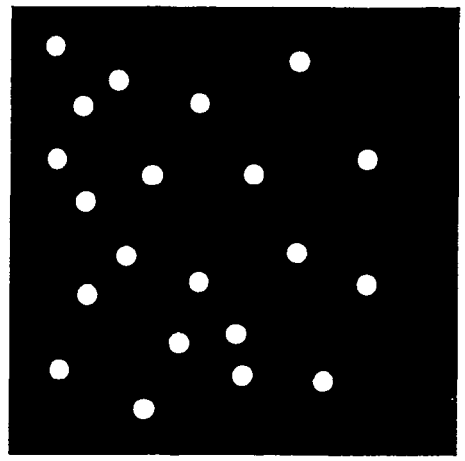
Picture 1
Image of
Tag 1
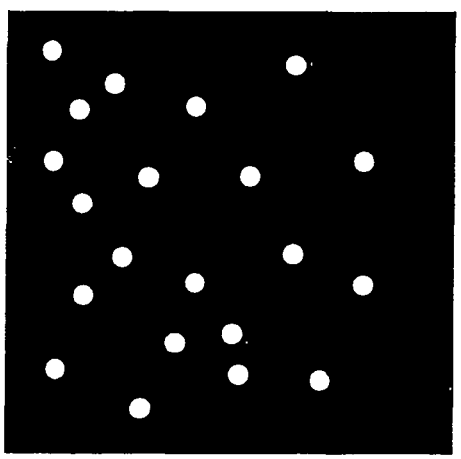
Picture 2
Repeat
image
of Tag 1
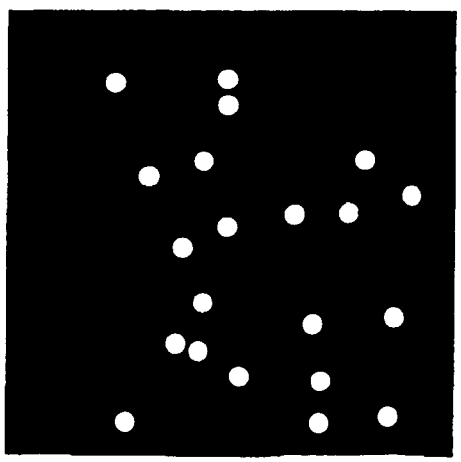
Picture 3
Image of
different tag
(Tag 2)

Figure 2
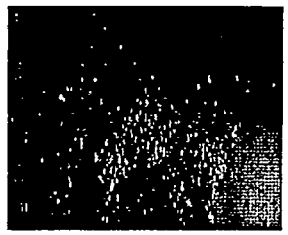
Original picture (raw data)
Original picture (processed for image enhancement)
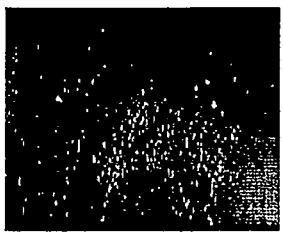
Picture 2
Same tag presented second time to reader (raw data)
Picture 2
(processed for image enhancement)
Picture 3
Different tag (raw data)
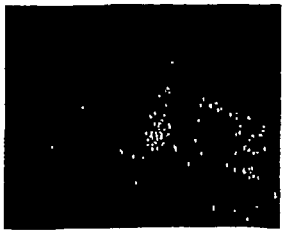
Picture 3
(processed for image enhancement)

Figure 3

The following numbers in each column represent the position (x,y) of the illuminated pixels in each image.

| File original | | File 2 | | File 3 | |
|---|---|---|---|---|---|
| 34,58 | 101,94 | 33,130 | 104,81 | 32,90 | 95,93 |
| 34,125 | 104,75 | 34,62 | 105,80 | 51,65 | 96,69 |
| 35,57 | 105,74 | 34,63 | 105,81 | 76,94 | 96,70 |
| 35,58 | 105,75 | 35,61 | 112,121 | 76,95 | 96,76 |
| 35,59 | 105,76 | 35,62 | 112,122 | 83,97 | 96,77 |
| 36,57 | 106,64 | 35,63 | 116,130 | 83,98 | 96,88 |
| 36,58 | 106,65 | 36,64 | 116,131 | 85,114 | 97,82 |
| 37,58 | 106,66 | 37,63 | 122,55 | 85,115 | 97,83 |
| 37,59 | 116,125 | 37,64 | 122,56 | 89,98 | 97,84 |
| 38,59 | 116,126 | 58,103 | 123,106 | 91,82 | 97,85 |
| 58,97 | 117,125 | 67,111 | 123,107 | 91,83 | 97,88 |
| 58,98 | 117,126 | 67,120 | 125,97 | 92,86 | 97,89 |
| 67,115 | 122,50 | 67,121 | 126,96 | 92,87 | 98,78 |
| 67,116 | 122,51 | 67,122 | 126,97 | 92,90 | 98,84 |
| 67,117 | 122,52 | 68,119 | 129,52 | 93,71 | 98.85 |
| 68,113 | 123,111 | 68,120 | 130,100 | 93,72 | 98,86 |
| 68,114 | 123,112 | 70,110 | 132,125 | 93,84 | 98,87 |
| 68,115 | 125,92 | 70,111 | 132,126 | 93,85 | 98,92 |
| 68,116 | 126,92 | 71,109 | 133,66 | 94,72 | 98,93 |
| 69,113 | 128,129 | 71,110 | 133,67 | 94,82 | 99,58 |
| 69,114 | 129,47 | 75,111 | 133,102 | 94,83 | 99,76 |
| 69,115 | 130,95 | 75,112 | 133,103 | 94,84 | 99,77 |
| 70,105 | 130,134 | 76,111 | 134,66 | 94,85 | 99,78 |
| 70,106 | 131,135 | 76,112 | 134,67 | 95,82 | 99,80 |
| 71,104 | 132,120 | 89,58 | 134,110 | 95,83 | 100,74 |
| 71,105 | 132,137 | 89,59 | 134,111 | 95,84 | 100,82 |
| 71,112 | 132,138 | 90,65 | 134,118 | 95,85 | 100,84 |
| 76,106 | 133,61 | 90,70 | 134,119 | 95,86 | 100,85 |
| 76,107 | 133,62 | 90,71 | 134,127 | 95,89 | 100,86 |
| 89,53 | 133,97 | 101,82 | 134,128 | 95,90 | 101,74 |
| 96,92 | 133,98 | 104,80 | 135,110 | 95,92 | 101,75 |

Sub-region bounded by co-ordinates
$x_1, y_1$ to $y_1, x_2$ to $x_1, y_2$ to $x_2, y_2$

Figure 7
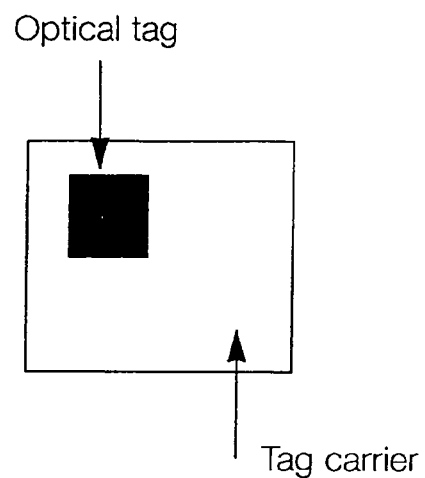
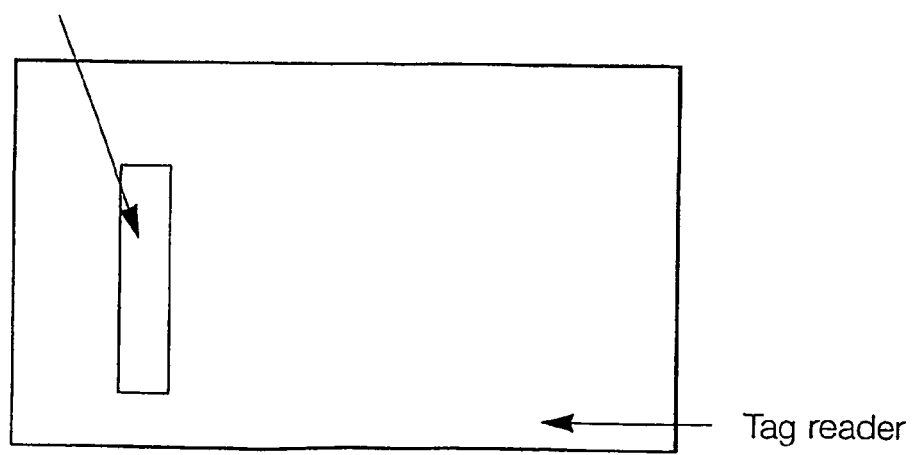

L = light

L = light

Figure 18
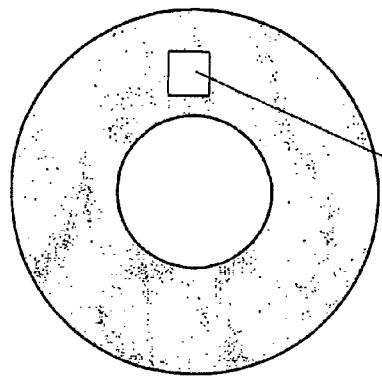
Tag on side-wall of tyre
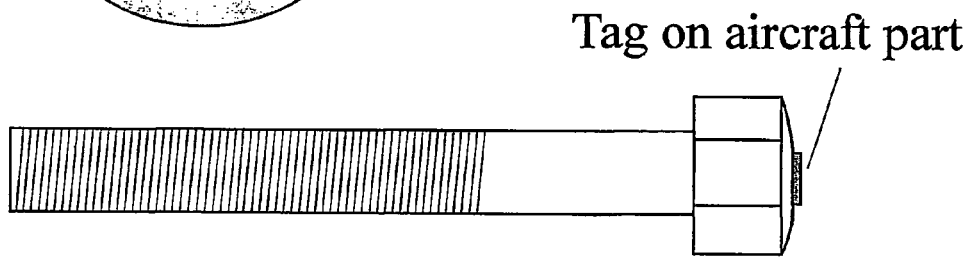
Tag on aircraft part
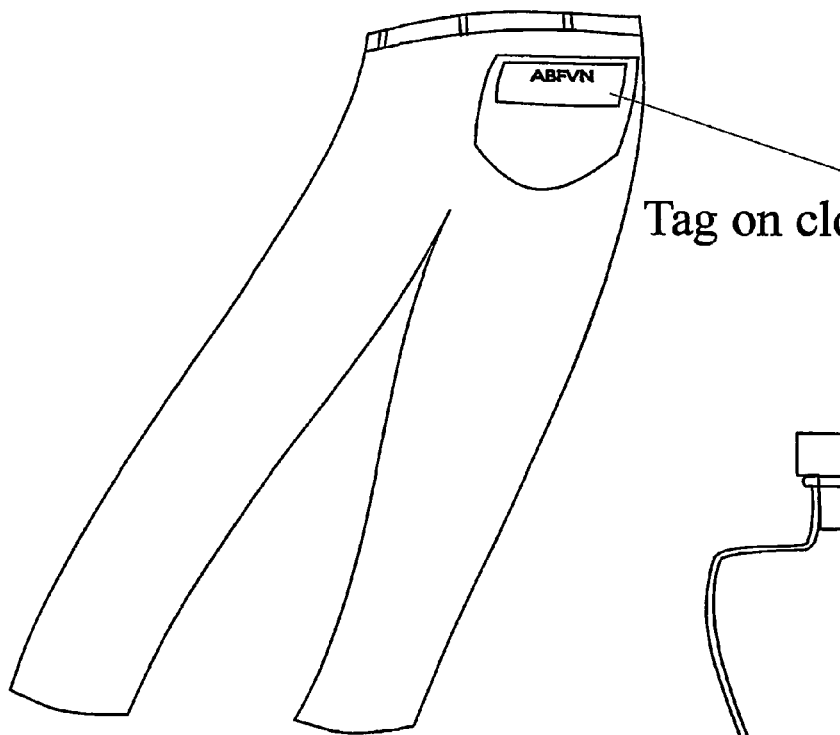
Tag on clothing labels
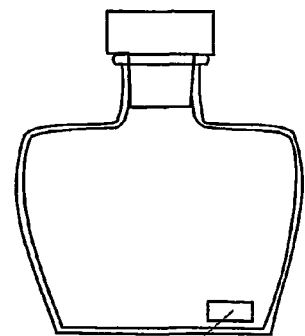
Tag in perfume bottles

Figure 20

MIOX Limited       DATA SHEET

---

Micaceous Iron Oxide   M I O X   S G
(according to ISO 10601)

---

Product:          natural, lamellar micaceous iron oxide
                  (alpha-$Fe_2O_3$)
Colour:           grey with metallic sheen
Grade (ISO 10601):  1
Type  (ISO 10601):  2

Iron content........($Fe_2O_3$ acc. to ISO 1248):  > 85 %
Density g/$cm^3$..................................:  4,7 - 4,9
Bulk densitiy g/$cm^3$...............(DIN 53466):  ca. 1,4
Volatile matter......................(ISO 787/2):  < 0,5 %
Loss on ignition at 800 °C......................:  < 1 %
Water-soluble matter.................(ISO 787/3):  < 0,3 %
pH...................................(ISO 787/9):  7,5 ± 1
Oil absorption g.....................(ISO 787/5):  19
Residue on 100 μm sieve..............(DIN 53734):  traces
Residue on  63 μm sieve..............(DIN 53734):  5 - 15 %

When viewed under an optical microscope by transmitted light, magnification x 200, the thin flake micaceous iron oxide particles appear as sharply defined red translucent platelets. When viewed under an electron microscope the pigment is seen as predominantly lamellar.

Figure 21
Fig. 2 Electron micrograph of MIOX SG
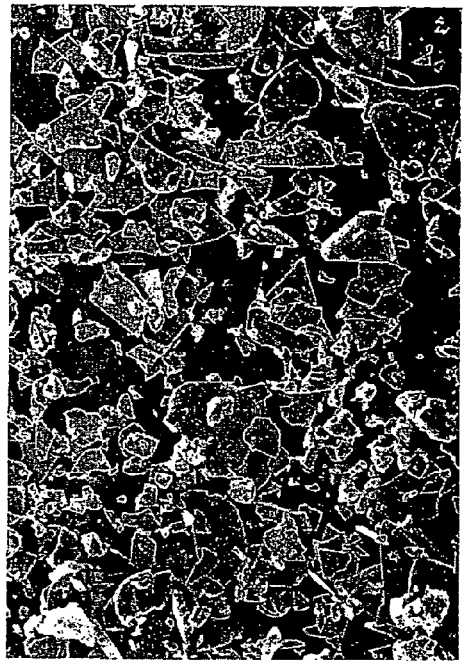
Fig. 4 Electron micrograph of MIOX AS
Fig. 1 Optical micrograph of MIOX SG
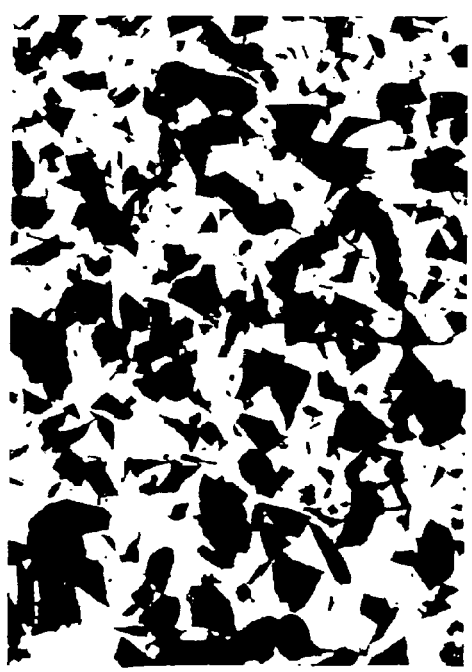
Fig. 3 Optical micrograph of MIOX AS Spectrometric curves from
http://www.coburn.com/spectro_blue_lg.htm

SECURITY, IDENTIFICATION AND VERIFICATION SYSTEMS

FIELD OF THE INVENTION

This invention relates to security, identification and verification systems and it is an object of the present invention to provide an improved tagging system involving the optical marking of many items with a non-forgeable unique identifier which can be applied to a wide range of, in particular, high value or safety critical products and which can be used for security, identification and verification purposes, including theft recovery purposes.

Commercial security systems rely heavily on security passes or identity cards to control many functions, such as physical access to sensitive areas or the withdrawal of cash from a bank account. If even a single card is illegally duplicated, then the security of the system will be compromised and the system may even fail totally. Of course, modern identity and credit cards carry numerous devices designed to make duplication very difficult, ranging from photographs of the authorised holder through to identical laser holograms attached to the surface of the card. However, such devices only make duplication difficult—they do not make it impossible.

Security technology is a constant battle between the manufacturers who make the systems and the criminals who try to beat the systems. The following list gives examples of the major anti-counterfeiting methods used to protect banknotes, high value or sensitive documents and credit cards, together with a brief assessment of how they may be overcome:

1. Holograms. Holograms were believed to be the perfect security tag, but in fact they are easily duplicable with the right equipment. The entry requirement for holographic duplication is within the reach and capability of considerable numbers of people. To reject a copy or fake it is, of course, necessary to know what the genuine hologram is supposed to look like.
2. Complex and colourful printing ink designs. Bank note security using complex patterns and multi-coloured inks has reduced the level of counterfeiting, but the advent of colour photocopiers and high quality 32-bit scanners has made forgery ever more easier. Knowledgeable printers are able to duplicate and develop plates to counterfeit currency notes, and such skills are highly prized.
3. Anti-photocopying inks and sprays. Considerable royalty income may be lost due to photocopying of sheet music etc. Some companies have developed sprays and inks which defeat many photocopiers, but this is not a widespread nor mature technology, and the same problems as with banknote counterfeiting often apply.
4. Smart card technology with embedded microchips. This technology is still new, yet already there are reports in the scientific and general press of techniques which can defeat the cards' in-built encryption systems.

The principle which applies to such systems is that "if Man can make it then Man can copy it."

Forging and counterfeiting are recognised as major international problems, affecting items as diverse as currency, credit cards, high value consumer products and even mass market aeroplane and automotive parts. In product forgery, companies can be damaged not only directly (due to lost sales) but also indirectly due to "lost" customers using products they believe to be genuine but really made to inferior or possibly dangerous standards. Counterfeiting, on the other hand, can result in the discrediting of a nation's currency.

Obviously these are serious problems. No anti-counterfeiting system can offer 100% security, because criminals will always attempt forgery if the rewards justify the time and technology they have to invest.

A number of anti-fraud systems have already been proposed which rely on reflective material of some kind (usually 2D) embedded within the fabric of a card. These, however, all have their limitations.

It is accordingly an object of the present invention to provide a system which includes the use of a tag which will be so resistant to forgery and counterfeiting that it will represent a major step forward in the fight against such criminal activity.

SUMMARY OF THE INVENTION

According to a first aspect of the present invention there is provided a method of producing a tag which comprises the application to a substrate of a matrix containing randomly distributed particles some at least of which include a reflective layer/component and/or a refractive layer/component.

According to a second aspect of the present invention there is provided a security system which includes means for producing tags as defined above, means for causing light to impinge on a tag and means for interpreting the light reflected and/or refracted and/or diffracted and/or otherwise operated on by the particles in the matrix.

According to a third aspect of the present invention there is provided a reader for use with tags as defined above, said reader including means for causing light to impinge on a tag and means for interpreting the light reflected and/or refracted and/or diffracted by the particles in the matrix.

According to a fourth aspect of the present invention there is provided a method of operating a security system, said method comprising making a plurality of tags, each of which includes a plurality of particles randomly distributed in a light-transmitting matrix, providing a reader which includes means for causing light of one or more wavelengths to impinge on a tag and means for interpreting the light reflected and/or refracted and/or diffracted by the particles in the matrix, and presenting said tags to said reader.

The matrix may be afforded by an optically transparent medium with which the particles can be mixed when the medium is in a fluid state and which sets or is caused to set after application of the medium containing the particles to the substrate. The matrix and/or the particles may alternatively be inherent in the object being "tagged". The optically transparent medium can alternatively be admixed with the particles and then allowed or caused to set to form a marker which can be attached to a substrate.

The invention thus involves the creation of unique three-dimensional optical signatures by the reflection and/or refraction and/or diffraction of light off randomly positioned and orientated particles, such as crystals and other complex 3D optical materials. The item to be identified and/or protected from counterfeiting is thus tagged with a unique optical marker, either during manufacture (e.g. credit cards) or after (e.g. works of art). This marker or tag contains many particles (typically 10 to 100, but it may be significantly different from this) reflective/refractive particles bound up in a protective optically-transparent medium.

When a series of markers are illuminated and read, each marker will provide a unique optical image since the three-dimensional particle layout in each marker will be different (see the statistical considerations set out below to see how different) and may have a strong intensity and colour variation from the host material (e.g. the remainder of a credit card). This image can be machine-read optically and manipulated both optically and electronically to store the image information. The image is typically read again when wanting to verify an article's authenticity and compared to a database or to image information stored on the article itself.

When light is shone onto the tag area of an object such as a credit card it may, or may not, be reflected and/or refracted and/or diffracted depending upon whether or not it strikes a particle. However, since the distribution and orientation of these particles is random in three dimensions (having been determined by the particles being stirred into the plastic or ink or other carrier during production), the pattern of reflected/refracted light must be unique. This pattern is used as the starting point to generate the card's unique signature.

The invention creates unique optical signatures by the reflection and/or refraction of light off randomly positioned and orientated crystals and other complex 3D optical materials within a tag area in, on or attached to the item being identified. Once an object is marked with the tag, this identity can then be read using an optical device and electronics means to verify its authenticity in a class of objects (e.g. genuine articles from a manufacturer such as branded goods) and to identify the specific object (e.g. a specific item from a class of objects or an individual item such as a specific work of art).

The particles which are used may comprise particles of metallised plastic foils (sometimes referred to as holographic materials) and other complex optical effect foils, plastics and other materials which create complex light patterns which can be of complex mixtures of colours as observed by the optical reader. The method of the invention does not involve the use of holograms (which are identical across a class of objects) as such but numerous pieces of, for example, a holographic material in a random pattern which does not have to be known in advance by the verifying person or system.

The present invention represents a radical departure from the norm because it reacts not just to the presence in particular positions of reflective and/or refractive particles but also to the orientation of each individual particle: i.e. it is multi-dimensional (>2D). Anybody attempting to duplicate an item protected by the process faces the problem of duplicating a light pattern generated by many small fragments distributed and rotated throughout the item in a broadly random manner.

Features which make the system different from other marking technologies include the following:
a) The reflective particles are small and the optical patterns extremely complex and this provides a system that is highly resistant to physical reconstruction. The odds of a random match are orders of magnitude less than DNA random matching and winning the UK national lottery every week.
b) The reflective and/or refractive profile produced by light falling upon the tag is unique and resistant to copying because of its 3D nature.
c) Markers can be applied to an extremely large number of substrates and surfaces.
d) The system can combine optical and electronic manipulation of a marker with data compression and encryption, which enables protection of items such as tickets, CD ROMs, engine parts, passports, ID cards, bank notes, promissory notes and many other applications.

The technical specification of a tag or marker will be governed by the market assessment of each application, since the nature of the item to be marked will define the range of options possible (e.g. the level of security required and target selling price will determine the level of complexity/non-forgeability of the tag, the item's melting point will define the maximum temperature of any linked processes, etc.). The technical approach will be to look at the optical characteristics of the particles, e.g. crystals and other materials deemed suitable for the identification system formulation, and study how they would be affected by various methods of attachment or incorporation. This work will then determine the processes needed to "tag" products at low to medium speed (such as access control cards), and indicate if a simple low cost machine reading system can be developed. The reader will require the ability to detect light reflectance and/or refractance patterns and compare them with a local database (e.g. for access control), or, in the case of remote operations, to use storage of image data on the object itself. The data may be compressed and/or encrypted. Thus software design will be a key aspect of reader design.

The design of a secure tagging technology needs to accept that:
1. Any specifically designed pattern can be duplicated using identical technology.
2. Similarly, that any surface features designed in the system can be duplicated.
3. Given time and effort any 2D pattern can be copied, no matter how complicated.
4. The most difficult pattern to copy is a multi-dimensional one produced at random, and this difficulty is greatly increased if the random pattern has a 3D component.

The method of the present invention thus includes:
1. The use of optical particles chosen by their nature, structure, features, shape, size, colour, etc.
2. The use of a formulation consisting of the particles of chosen concentration within a medium able to meet the anti-counterfeiting specifications, which can be printed or applied in some specific process to form a "security tag".
3. A method of attachment, or incorporation in the item's production process, which can withstand tampering or demonstrate that it has been tampered with. The attachment process will also be application-specific.
4. A reader, including light source(s), able to digitise the "signature" of, say, a credit card and place this in some form against a reference image.

The problems of tag attachment are clearly linked to formulation, and will vary according to the specifications of each application. However, even if a tag could be removed, additional safeguards (such as encryption) can be used to defeat possible forgery. If tag encryption/decryption is incorporated into the system then:
1. Substitution of fake for real becomes a possibility only if the tag and its encrypted serial number are transferred intact to another item.
2. If the tag and its encrypted serial number are applied separately (using different techniques) then the problems for the counterfeiter should increase because he/she faces the problem of moving two labels rather than just one.
3. By using dual key encryption (a technique used to protect banking computers and military communications) it is impossible for the forger to make a fake tag which matches a genuine encrypted number. The encryption process used to generate the serial number uses a "private" key known only to the manufacturer. Encryption and decryption are non-reversible processes, so it is impossible for the forger to identify this "private" key even though he has a genuine serial number, and the matching "public" key which converts that serial number back into the original electronic signature.

The design of specific embodiments will vary with each application, depending upon such factors as:

1. Security level required (a function of complexity of image, particle concentration per unit volume, number of colours, etc.).
2. Type, size, shape, etc. of the item onto (or into) which the tag is to be incorporated.
3. Whether the tag will be incorporated during manufacture or added later.
4. Whether manufacture is low volume or high volume, low speed or high speed.
5. Whether the readers will be portable or fixed, and their planned operating environments.
6. The commercial value of the items being protected (i.e. the solutions must be cost effective when compared with the potential cost of item loss or a security breach).

As explained above, the present invention uses a random 3D pattern to generate a unique identity for each tag which is practically impossible to forge. The system has up to eight or more "degrees of randomness" which a forger would have to match if he/she were to make an exact copy. These degrees of randomness are as follows:

(1)-(3): the position of any particle in 3 dimensions within the fabric of the tag;
(4)-(6): the freedom of any given particle to rotate in 3 dimensions;
(7): the size, colour, and other features of any given particle;
(8): the composition of any given particle—a crucial factor if more than one type of particle is used in the tag.

The odds against any two random particles having features whose orientation matches exactly in at least two different planes are estimated as being extremely low, as explained in the statistical considerations set out below.

The "signatures" are thus not man-defined, but are based on the random distribution during production of, for example, naturally occurring minerals, holographic materials, etc. in a matrix—a system which gives up to eight or more degrees of freedom. Other systems are based on man-defined technology which can then be duplicated by using similar technology. The method of distribution of the particles is highly random, and attempts to duplicate any specific tagged product have to take into account so many variables as to be virtually impossible (or, at least, uneconomic).

The most significant aspect of the use of particles of a metallised foil, sometimes referred to as a holographic material, as the optical particles is that the colour is not necessarily inherent in the material but is brought about by the refraction of light producing a 'rainbow' effect whereby specific colours are only seen at specific combinations of light-source to particle to detector geometry. Thus the depth, angle, orientation of the pattern on the particles, variations of the pattern, all have to be duplicated for each particle in order to create a forged tag. This is judged to be impossible or economically non-feasible.

The following sequence of operations may followed, though other operating procedures and technologies may be employed:

The region of the article to be tagged is decided upon for practical and security reasons.

The level of security is decided on in terms of number of false accepts and false rejects.

A compromise is struck between security level, speed of reading, and cost of solution. For example, a higher proportion of false accepts and a lower proportion of false rejections will be chosen in a low security application such as sports ticketing in order to allow fast entry into the sports ground. For high security and safety applications such as military access control and aircraft parts verification, there would be more time to ensure a lower number of false accepts.

The reflecting and/or refracting particles are selected from any of the possible types of particles (e.g. geological crystals, holographic foil, etc.) and combinations of characteristics (size, features, colour, etc.).

The particles are mixed in a formulation medium such as a glue or other carrying agent to provide a random mix.

The mix is either applied directly, or via a medium, or otherwise incorporated in the manufacturing process in as random a way as is practical. For example, the tag mixture could be part of a glue placed on a part of a work of art or it could be introduced into one of the laminate layers during manufacturing of a credit card.

The crystals or other particles may be protected physically by a variety of means as described below.

To 'activate' the system, the tag area is presented to the reader, the tag area is illuminated by one or more light sources and a pixel by pixel image of the illuminated particles is recorded in the reader.

The nature and resolution of the recording system will be tailored to each application and may consist of a number of optical and electronic recording devices. The current design involves the use of a Webcam CCD device.

The image is stored (temporarily or permanently) on a PC or other processing device (which can be a stand-alone device, a networked device, or a portable device) and possibly via some sort of hard storage device such as film, via printing, etc.

The image is a pixel-by-pixel (x,y) array of intensities (e.g. grey scale) or colours and brightnesses.

In a black and white version, a brightness threshold is set in order to remove most of the background light from the substrate compared to that from the reflecting particles—above this threshold is digital 1, below it zero.

Starting from a fixed position (typically top left hand corner but could be from any grid co-ordinates), the x-y positions of the first 'n' illuminated pixels are recorded. [It is also possible to record the 'n' brightest spots or merely to record a sub-region of the total image—the co-ordinates of which could be encrypted to provide an extra level of security.

Where the particle images are bigger than the pixel resolution, it is possible to record the centroid position and area of the 'blob', or other features.

These co-ordinates can then be encrypted and the encrypted co-ordinate information (only) stored on a centralised database (PC or other) and/or on the device or tag itself (for example, on a smart card but it could be on a 2D bar code or other printed, magnetic, semiconductor, optical, biological, chemical, etc., storage medium). Any supplementary information, such as the address of the cardholder etc. is an additional benefit. Alternatively, where the system is to be used in an entirely self-contained application (e.g. high-level access control), the image may be stored instead on a central computer on-site or via electronic link.

When the tag is to be used in the field to demonstrate a genuine article from a class of articles (e.g. a genuine branded item of clothing but the particular article is not identified), or to identify it as a specific article (e.g. a specific artwork, etc.), the tag is presented to the reader, the image is recorded, the encrypted co-ordinates of the original (genuine) image decrypted, and the PC etc. software then searches for illuminated pixels in the positions where they should be (i.e. for a measure of matching). It also searches for any extra illuminated pixels (i.e. for a measure of mis-matching, including to rule out the forgery case where the whole tag area is illuminated due to 100% coverage with particles).

The degree of matching (and mis-matching, and possibly a simple count of the number of illuminated pixels or light energy in each case) between the encrypted co-ordinates and the ones that agree in the image recorded at the point of use/verification decides on pass/fail. For low-level security (sports tickets) this could be quite low (e.g. 10%) whereas, for high-level security it would be much higher (e.g. 80%). This is down to the decision threshold on false positives and false negatives discussed above. Allowances for tag distortion, tolerances between readers, etc., may be made by a variety of well-known techniques, including the use of optical reference markers, fuzzy matching, etc. For example, allowance could be made for the cases where the mis-match between images follows a trend (e.g. whereby a linear transformation could be used to map the current image onto the stored one). Alternatively, matches where the current pixels are within a fixed number of pixels of the original could be allowed. Similarly, intelligent software could be used to correct for the presence of scratches, etc. The selection of illuminated pixels may be by the nth brightest spots or by the first n counted from a fixed point, etc. It is also possible to introduce some sort of normalisation of light level and colour by measuring reflectance etc. from a fixed spot. This normalisation could help compensate for tolerances between readers, especially the light source, and over time, and may help with the degradation of the tag (e.g. a credit card becoming grubby in a wallet). Note that this matching process only proves that the tag is genuine, it does not identify which tag it is unless one refers to a central database—which may be the case in certain applications, but not the bulk ones.

The statistics of randomly having two tags the same and the difficulty of deliberately forging a tag are summarised in the statistical considerations set out below.

The main technical parameters to be considered are listed below. It is likely that a significant number of each of these parameters will be varied for each group of applications, as specific technical and commercial challenges have to be overcome for each application. The list is not exhaustive.

Particles
1. Type (e.g. type of 'natural' material, artificial crystals, other manufactured materials such as metallised foils, also known as Holographic Jewels, etc.)
2. Refractive index
3. Hardness
4. Size
5. Packing density
6. Shape
7. Nature of surface(s) and features (e.g. crystal facets, holographic material patterns, etc.)
8. Colour or ability to produce colour
9. Stability (vs. time, environment, light exposure, use and abuse, etc.)
10. Compatibility with tag formulation medium, etc.
11. Compatibility with process for incorporation in tag
12. Compatibility with product use, etc.

Formulation medium
1. Properties of medium in which the particles are mixed, suspended, dispensed onto or into the tag etc. must maintain orientation of particles until 'frozen' or 'set'
2. Must be applicable in an automated manufacturing process
3. Must be able to absorb the required density of particles
4. Must have rapid and cost-effective 'fixing' process
5. Must have suitable optical properties including being transparent with respect to the selective wavelength and not introducing undue diffuse scatter Method of attachment to or incorporation in tag
1. Via glues, potting agents, etc.
2. Via sandwiching and other non-gluing techniques
3. Via incorporation into material being tagged
4. Area to be tagged
5. Separate tag attached to object Method of protection of tag
1. So that tag not degraded when used or stored correctly (e.g. raised ridge around tag area in card-type applications)
2. So that, in some applications, the tag breaks when being tampered with, etc.
3. Limits of distortion of tag Optics system of reader
1. Light sources (intensity, wavelength, heat output)
2. Degree of darkness without light source being on (background)
3. Method of lighting (direct, reflected, diffuse, filtered, polarised, etc.)
4. Geometry
5. Number of sources
6. Lenses, mirrors, prisms, colour filters, polarisation filters, etc., as required by other parameters
7. Method of introducing card, etc., reproducibly
8. Detection system, e.g. camera, photodiode, CCD system (pixels/resolution, intensity and wavelength sensitivity, stability, speed, colour or black and white)
9. Overall package requirements (large 'brick outhouse', portable credit card reader, "Psion" attachment, etc.)—this ties into size etc. of other parts of reader and whether tag is introduced into reader (like an ATM) or is read as is (e.g. as per supermarket barcode reader)
10. Interface requirements to computer
11. Positional tolerance of all of above (also depends on shape etc. of object tagged)
12. Environmental tolerance of all of above (indoors, outdoors, temperature, humidity, vibration, etc.)

Computer
1. PC
2. Laptop
3. Palmtop
4. Embedded processor/controller
5. Stand-alone or as part of a network, etc.

Software
1. Image capture

2. Image storage
3. Image processing including allowing for distortion and damage (e.g. scratches) of tag region
4. Encryption
5. Decryption
6. Matching, etc.
7. Interface to user application (e.g. turnstile, cashpoint, etc.)

Complementary Technology (e.g. what else might be on the card, etc.)
1. Printed information
2. Pictures, holograms, fingerprints, etc.
3. Barcode
4. Magnetic card
5. Smart card Overall Manufacturing Process for Tag
1. Must be possible to automate
2. Must meet specification
3. Must be cost-effective for the volume required
4. Must be easily incorporated in manufacturing process, where appropriate
5. Must not have negative effects on item being tagged Overall Manufacturing Process for Reader
1. Depends on volume more than tag (e.g. could be 'hand-crafted' in low volume—unlikely for tags)
2. Components must have long term availability
3. Must have a low design tolerance
4. Should be compatible with mass production Choice on all these Parameters will be Application-Specific, e.g.:
Level of security
Rate of false positives
Rate of false negatives
Nature of item being tagged
Value of item being tagged (e.g. Mona Lisa Vs plastic)
Volume of tags to be made
Price target for tags
Price target for readers
System to be sold or hired
Continuous use or one-off event
How long to last for
Stand-alone or database system
Flexibility of tag (e.g. in pockets, etc.)
Environmental conditions (aero engine vs. credit card)
Competitor technologies (technical and pricing information)

A card produced by the method of the present invention may be used in reducing the incidence of fraudulent on-line credit purchases. Thus, a user's computer or other hardware, for example, an intelligent telephone, will have a slot or other opening into which a card can be inserted and the computer or other hardware will incorporate a reader having the facilities referred to above. When making an on-line purchase, the user will insert the card, instead of or in addition to entering his or her credit card data when making an on-line purchase, and the information on the card will be used to verify, identify or authenticate the purchaser.

For some applications, the reader may include a plurality of sources and a plurality of detectors thereby introducing a further "degree of randomness" in that not only the direction but also the intensity of the sources can be varied.

The use of variable output devices may also be enhanced by the use of filters between the card, tag or the like and the detector(s). This would mean that low intensity reflections from the card, tag or the like might (or might not) have to pass through a simple optical filter and, therefore, might (or might not) cause a response in the detector(s).

For example, the filter may contain a complex pattern of light and dark areas and may be caused to rotate in a controlled manner while scanning is being carried out. The result would be an output from the sensors measured over time, with this output being affected over time by the reflected beam(s) having to pass through a filter of randomly changing density.

Instead of using a rotating filter, a fixed filter could be included in the reader such that, if the reader were held in a high-security environment, would make it difficult for a forger to replicate the effect of the filter. Using different filters and/or different diffractive optical elements in the scanners can produce a system suitable for, for example, access control in that each filter/diffractive optical element combination will generate a different response when presented with the same card, tag or the like.

The system may have a monochromatic environment in which only the intensity of the reflected pattern is being measured. The diffractive optical elements may, however, be such that they emit different wavelengths of light depending on how they are configured. Filtering may then be by both colour and filter density.

In a further embodiment of the invention, a light sensitive emulsion on photographic paper may incorporate a random coating of inert reflective crystals, thereby forming a tag so that a photograph taken using the photographic paper will have its own in-built unique identity.

Such a technique could prevent the forgery of photographs used in official documents, such as passports. It can also be used to authenticate high value limited run printed documents, such as artistic prints or other items which are vulnerable to forging.

Use of a tag produced in the above way which laid across the boundary between a photograph and its partner document would mean that the photograph and its document could not be separated without damaging the tag and would lead to the generation of a wrong result when scanned. This would prevent the insertion of an illicit photograph into a genuine document.

The built-in tag on a photograph produced as described above can be used in conjunction with a separate tag on a partner document to generate a "virtual" tag. Each tag may be converted into a numeric format and then one tag is used to perform a mathematical operation(s) on the other tag to generate a numerical result(s). Building a tag for, for example, an illicit passport photograph would then be virtually impossible because it would have to meet this additional requirement to generate a specific number or series of numbers.

A similar system may be used in any other situation in which pairs of items need to be authenticated together. For example, such a system may be used to ensure that a part of an aircraft matches its paperwork.

In a still further embodiment of the invention, the randomly distributed particles are such that they have different optical properties when subjected to magnetic fields of different intensities. When, therefore, tags are produced using such particles, the readers employed for interpreting the patterns on the tags will include means for subjecting the tags to a magnetic field and, if desired, means for varying the intensity of the applied magnetic field.

BRIEF DESCRIPTION OF THE DRAWINGS

FIG. 1 shows the concept of two identical images, e.g. images of tag 1 taken at different times, and the image of a different tag, e.g. tag 2. For a tag to be deemed genuine, it must match with a defined image to a defined percentage or other match criteria.

FIG. 2 shows actual recorded images, for micaceous hematite crystals, before and after image enhancement brought about by increasing the contrast of the bright spots to the background by setting to zero any recorded light levels beneath a pre-set threshold. Note that, even without computational methods of image comparison, the similarities between the dot-map images of picture 1 and picture 2 (the same tag read twice) and the differences with picture 3 (of a different tag) are readily apparent.

FIG. 3 shows some of the x-y co-ordinates of the illuminated pixels detected in each of the images of FIG. 2.

FIG. 7 provides a system overview of the basic modules of the method of the invention as applied to a flat object that has been tagged. Shown are: the optical tag area, the tag carrier (object being tagged or attachable tag), the tag reader (which can act as an automatic verification system), and a slot or other mechanism for presenting the tag carrier to the reader. The tag area may range from microns to centimetres.

FIG. 13 is a diagram showing one of the ways colour variations are obtained with holographic materials, etc. Some of the light falling on to the transparent film is reflected from the top surface at angle $\Im_1$. Other portions of the light are refracted and the light passes through the film, of refractive index n and thickness d, until it reaches the lower surface where again some of the light is reflected. As it passes through the top interface, it will again be refracted. In some cases, the light will take off in the same direction ($\Im_1$) as the light that was reflected at the top surface only. However, the light that was reflected at the lower surface may have a different phase to the light reflected from the upper surface, due to passing through the film and through reflection at the bottom surface. The extent of the phase difference will depend on the thickness and refractive index of the film, the angle at which the light strikes the film surface, and the colour of the light. If, for a particular colour, the two reflected rays are in phase with each other at the take-off point on the surface, then they will add together to produce a bright reflection, known as constructive interference. If they are out of phase, they will largely cancel each other out and that colour will only be weakly reflected, due to destructive interference. Thus, depending on the thickness and composition of the layers, the dimensions and spacing of grooves in the transparent film (which vary the path lengths and other geometries), the wavelength composition of the light, the light-source to particle to detector geometry, the orientation of the particle, plus the effect of any optical components placed anywhere in the path of the light, one will get a very geometry-specific intensity and colour for the light detected at each pixel position. Due to this complexity, it will be extremely difficult to duplicate, and hence to forge, such a pattern. Additionally, a stack of such films spaced by air layers will give vivid iridescent colours when viewed in reflection using white light. In some applications of the invention, such a combination may be used. The complexity of the effects may be enhanced further by the use of multiple (periodic, zig-zag, and other variations) layers, polarised light, multiple wavelength sources, and so on.

FIG. 18 shows application of the invention to non-flat objects, such as a tyre, an aircraft part, a label on a pair of 'designer' jeans, a bottle of perfume, etc. If, for example, the tag has a substrate which is formed of or includes a material which can be attracted by a magnet, a magnetic field may be applied to move the tag into a position in which it is accessible by the reader.

The particles which can be used include the following:

Micaceous hematite crystals, MIOX SG 9713 (geological crystals)

Alpha Jewels 015HEX, supplied by Ronald Britton & Co and, it is understood, manufactured by Meadowbrook Inventions, Inc. in the USA ('holographic' manufactured material), but the invention is not limited to these manufacturers or types of particles Micaceous hematite is a natural form of $Fe_2O_3$. The material used to date is mined in Austria. A data sheet for the MIOX product is presented as FIG. 20, whilst FIG. 21 shows optical and electron micrographs of the material. The particles are under 100 μm in size and of a very irregular shape. The micrographs give an indication of the complexity of producing a forgery of a tag made with this material. As the melting point of the material is over 1000° C., it can be used in a wide range of environments and is very stable. It is an important barrier pigment used in coatings to protect structural steelwork from corrosion.

Other materials having complex multi-faceted crystalline or other structures and of various colours may also be used. As mentioned above, particles which have different optical properties when subjected to magnetic fields of different intensities may also-be employed.

'Holographic' materials include "Alpha Jewels", "Polyester Jewels", "Lazer Jewels", etc., and various manufactured materials with transparent and reflecting layers (with and without features manufactured in the layers) such that the intensity and colour of light detected is strongly geometry dependent.

One example of this material consists of holographic or coloured precision-cut sheets of material cut up into particles of about 0.2 mm diameter. Typically, metallised films have patterns cut or micro-embossed into them over which there may or may not be transparent overlayers. The material has a melting point in the range 177° C.-190° C. (cf. over 1000° C. for MIOX) but practical operating temperatures are likely to be much less than this. A reflecting layer is cut into various patterns and a transparent overlayer placed above it. As a result, images, colours, etc., vary according to the angle of illumination and observation. Sub-mm. sized pieces of the material are laid down in/on the tag at random orientations and locations.

Figure 4A:
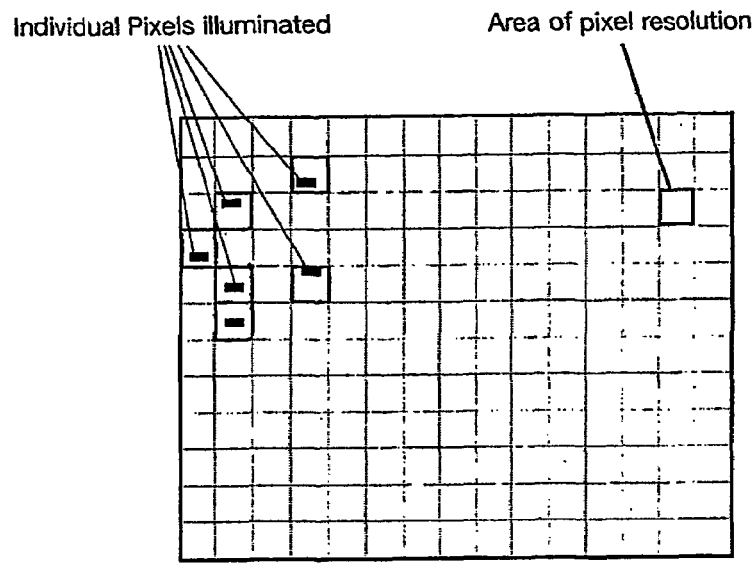
FIG. 4 shows the two extreme cases where the particles are of a size such that light emitted from them is generally smaller than the pixel resolution (FIG. 4*a*) and where the particles are of a size such that light emitted from them is significantly greater than the pixel resolution (FIG. 4*b*). In the former case, the positions of the illuminated pixels are random. In the latter case, interconnected regions of illumination are not random (although the overall positioning of the particles is random) and software can be used to recognise shapes (as another degree of freedom in increasing the complexity and hence non-forgeability of the tag) and to 'repair' missed pixels due to reader tolerances or damage to the tag (e.g. scratches). The positions of these larger-than-pixel features may be defined by a variety of means, e.g. their centroid, first edge encountered from a particular direction, etc., and their areas recorded.
Figure 4B:
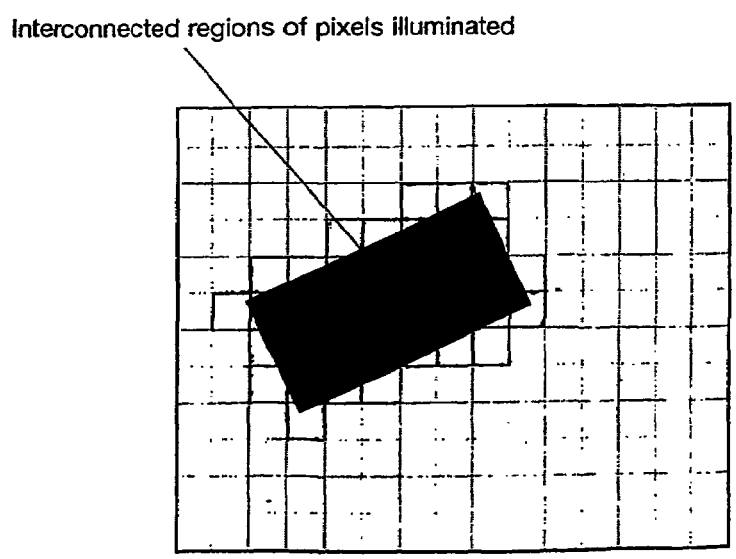
Figure 5:
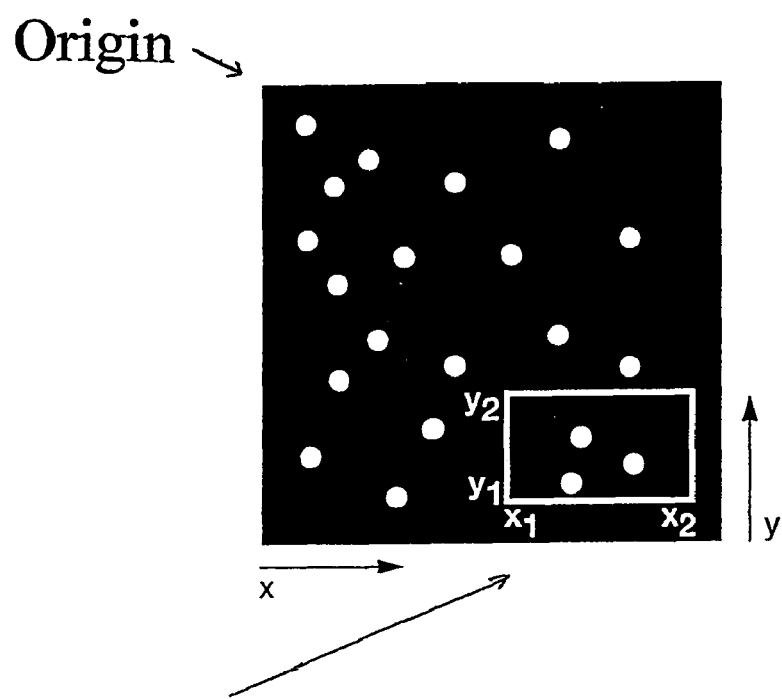
FIG. 5 shows the case where the image information of a sub-region (or sub-regions) is stored and the location of this sub-region encrypted. Thus the potential forger of the tag does not know which sub-region to forge on what could be a very complex image and one only has to store a small fraction of the total image information (e.g. a linear array only, in some applications). This has significant advantages for security and speed of processing. Similarly, the location of the tagged area itself could be covert where the tagged area is small to the eye or where it is hidden in an optically complex background. In some applications, the entire surface (or buried layer) of a material could be 'seeded' with optical particles with only one or more sub-regions selected to be the tag. An example of this is where the particles are introduced into the material of one of the transparent layers of a credit card during manufacture.
Figure 6A:
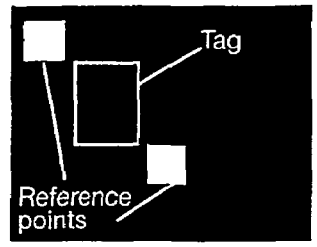
FIG. 6 shows the use of optical reference points to realign images distorted by inter-reader tolerances or shape changes in the tagged region of the card, etc. (e.g. brought about by being bent in a wallet, etc.). Various structures are possible, such as triangularly positioned spots, an oblong border around the tag area, and so on. In the example provided, two spots are created on the card—one at the top left corner of the tag and the other at the bottom right hand corner of the tag (see FIGS. 6*a* and 6*b*). The illuminated spot closest to the top left hand corner is found and its co-ordinates are subtracted from the co-ordinates of all the other illuminated pixels so that it becomes the new origin at the top left corner (FIG. 6*c*). The illuminated pixel furthest from the top left corner is also found and a linear transformation is defined to translate its co-ordinates to a reference point in the original image. This linear transformation is then applied to the co-ordinates of all the illuminated pixels, as a function of their position (FIG. 6*d*). This is just one example of a method to correct for distortions, etc., and others may be applied.
Figure 6B:
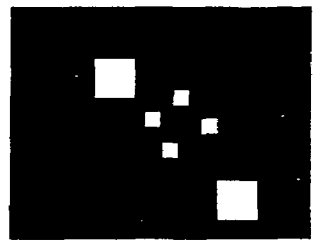
Figure 6C:
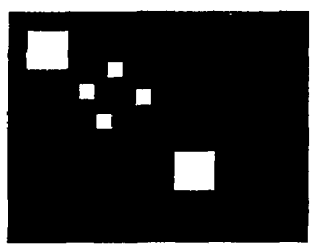
Figure 6D:
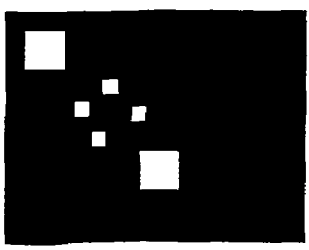
Figure 8:
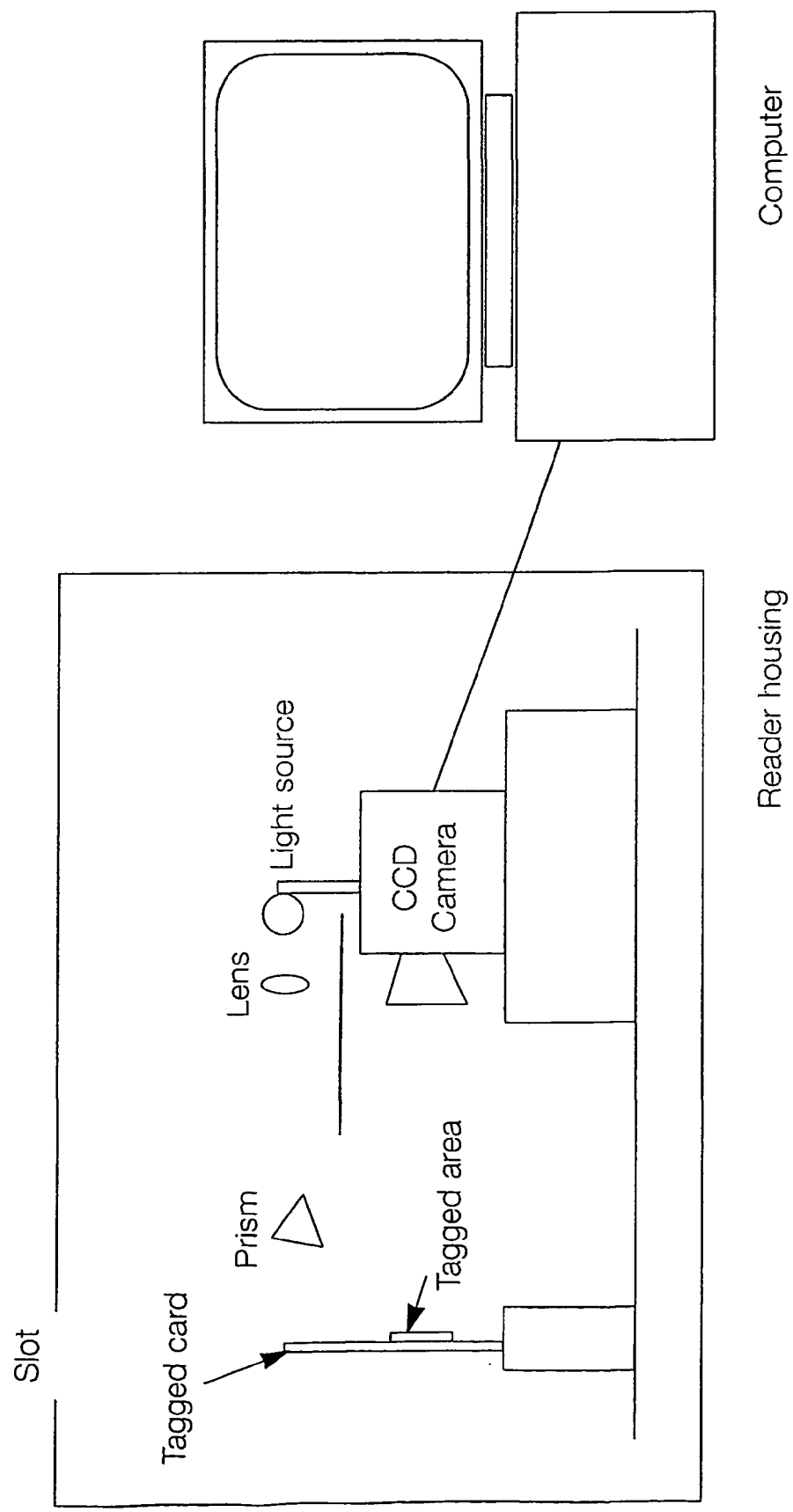
FIG. 8 is a schematic diagram of a test system for the method of the invention as applied to a tagged credit card. Shown are: the reader housing which cuts out most of the ambient light, a slot or other mechanism for presenting the card into the reader, a means for holding the card in a reproducible position (but errors due to tolerances in this can be overcome via the methods described in respect of FIG. 6), a light source or sources (which may be of many types, including incandescent), a screen to prevent direct light from the light source entering the detector, lenses, mirrors, prisms, polarisers (which may vary from light source to light source within a reader), and other optical devices to shape and wavelength-select, etc. the light beam, a means for detecting the light in a 2D manner with pixel numbers from 10's×10's to 100's×100's such as a web cam CCD, or in a 1D manner, and a computer or other processor for processing and storing image data.
Figure 9:
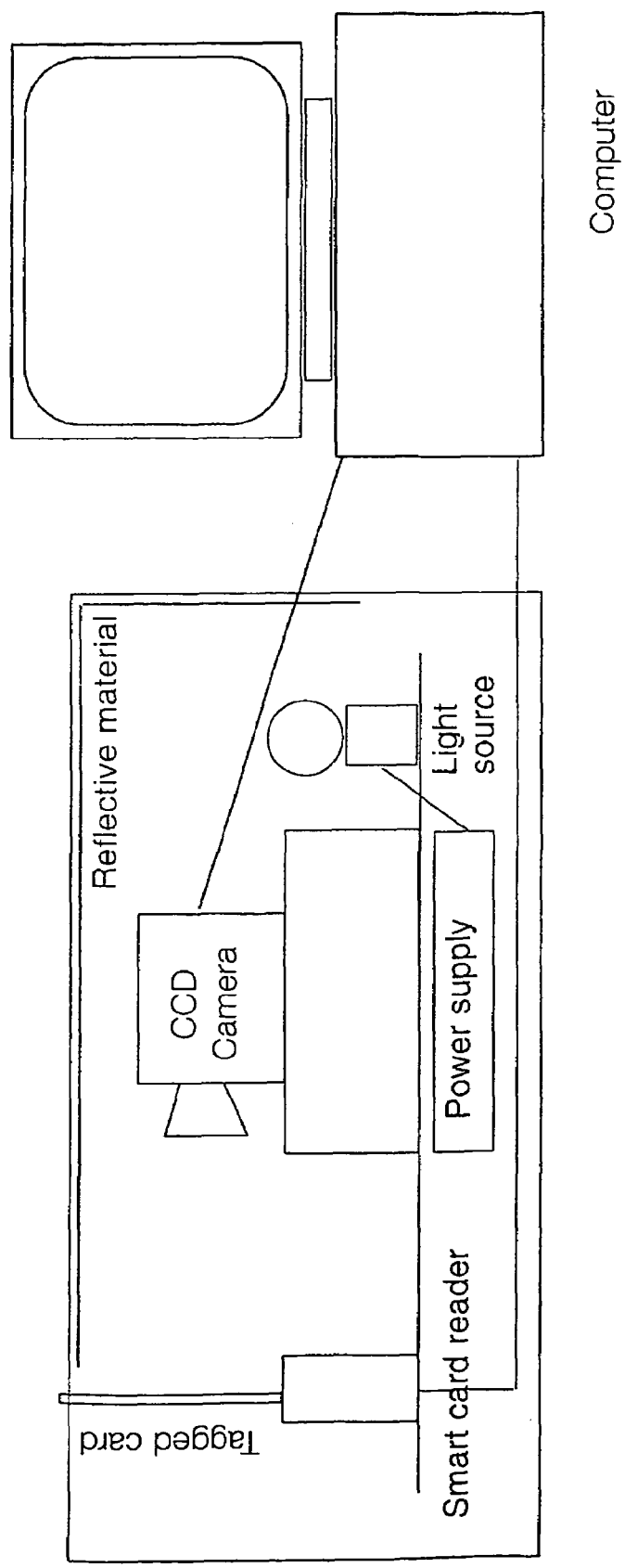
FIG. 9 is as for FIG. 8 but with the addition of a smart card reader for creating and reading stored image information on the card. A power supply is also shown. If the stored image information is in a visible form such as a bar code, then the detector for the tag image may also read the bar code. The addition of multiple light sources at different angles of incidence will increase the 3D nature of the optical tag (increasing the difficulty of producing a 2D forgery to impractical levels). The narrower the angle of illumination to particle to detector, the more sensitive the system will be to any misalignments. This will make the tag harder to forge but it will also increase the requirements on card and reader tolerances. The compromise will depend on the level of security required, the consequences of false rejection, and the cost.
Figure 10:
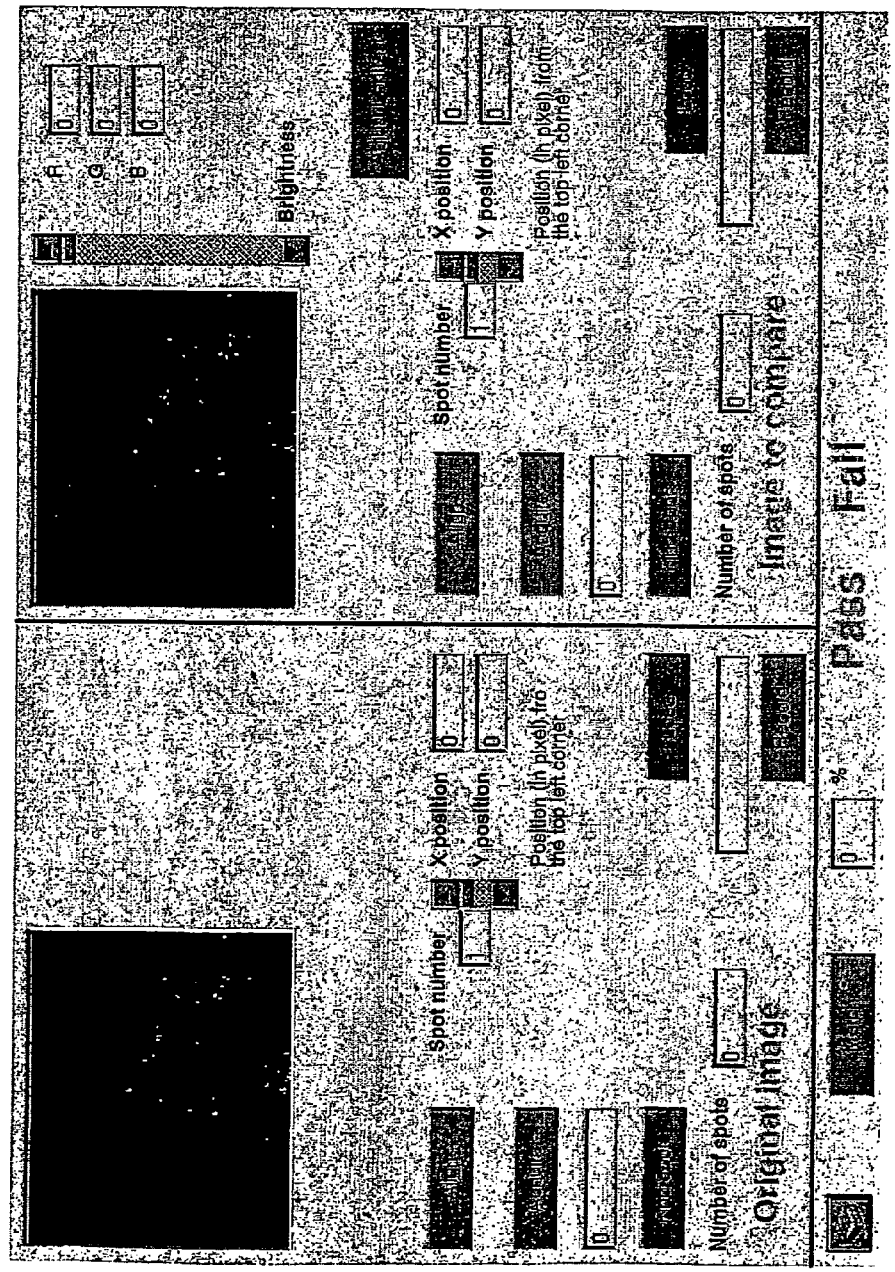
FIG. 10 shows a user interface for carrying out test work. Buttons allow one to acquire images and enhance them, find spots, and align them to the fiducial reflectors. The images can be stored and the x-y co-ordinates of each illuminated pixel can be read off. Comparison can then take place with other images.
Figure 11:
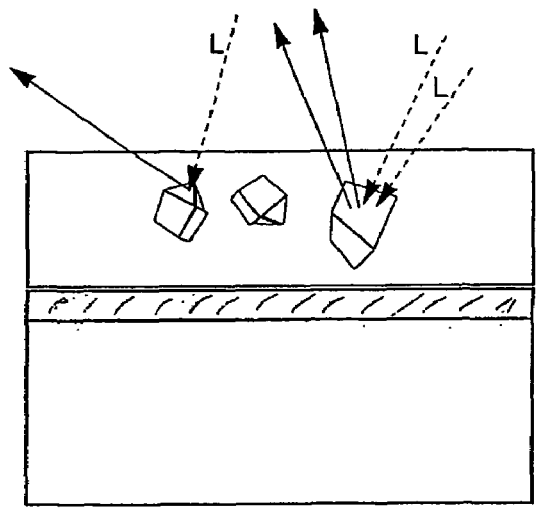
FIG. 11 shows reflections and refractions from crystals on the surface of a tag area. The pattern of detected light is dependent on the position, shape, and orientation in 3D of the particles.
Figure 12:
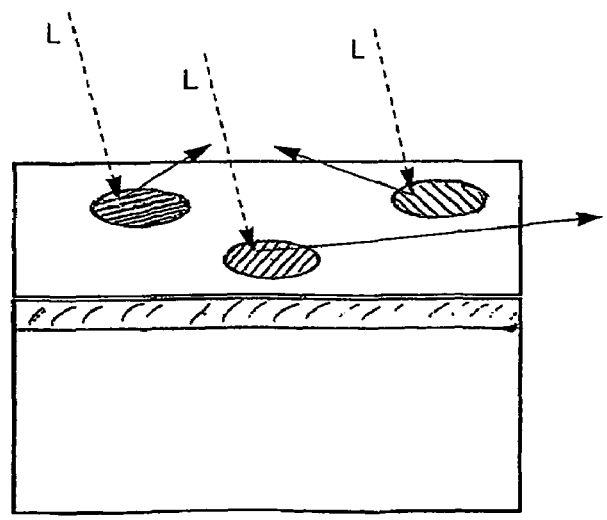
FIG. 12 shows reflections and refractions from particles of metallised foil, e.g. holographic particles on the surface of a tag area. The pattern of detected light is dependent on the position, shape, and orientation in 3D of the particles.
Figure 13:
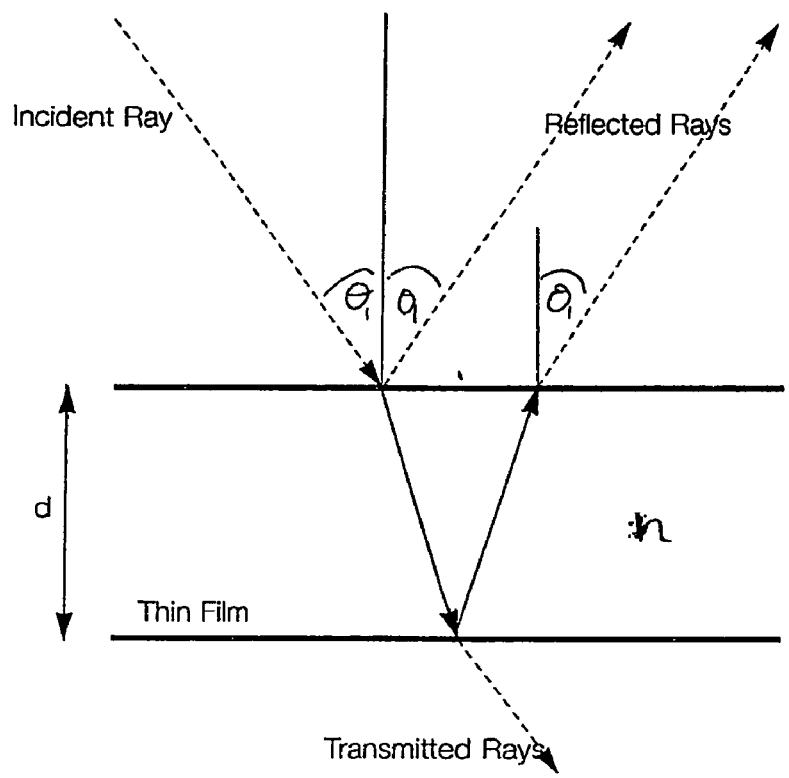
Figure 14:
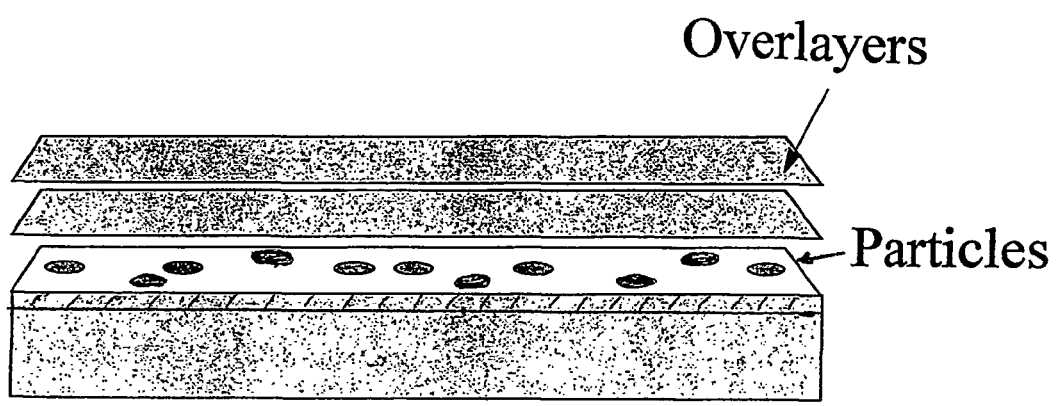
FIG. 14 shows how the particles may be embedded within a layer over which there are overlayers, each of which may have different dimensions and optical properties. Note that, for the narrow geometry holographic colour effect to work, none of the overlayers may diffuse the light significantly. For example, the effect is significantly impaired if the overlayer is Scotch Magic™ tape rather than conventional tape.
Figure 15:
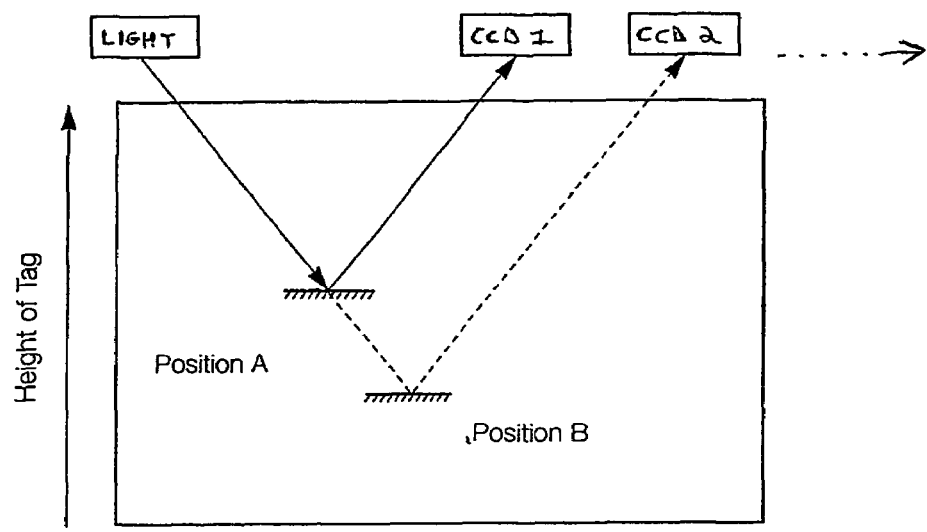
FIG. 15 illustrates how the patterns may be affected by the particles being at different depths within the tag.
Figure 16:
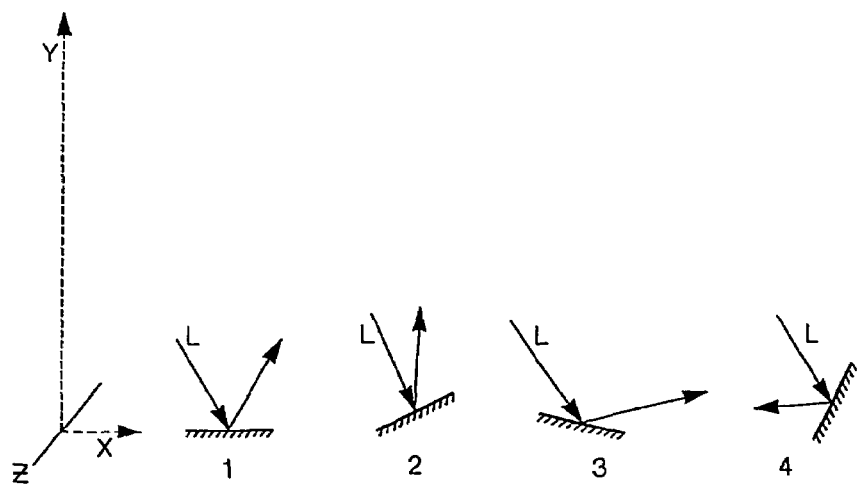
FIG. 16 illustrates how the patterns may be affected by the particles being at different orientations within the tag.
Figure 17:
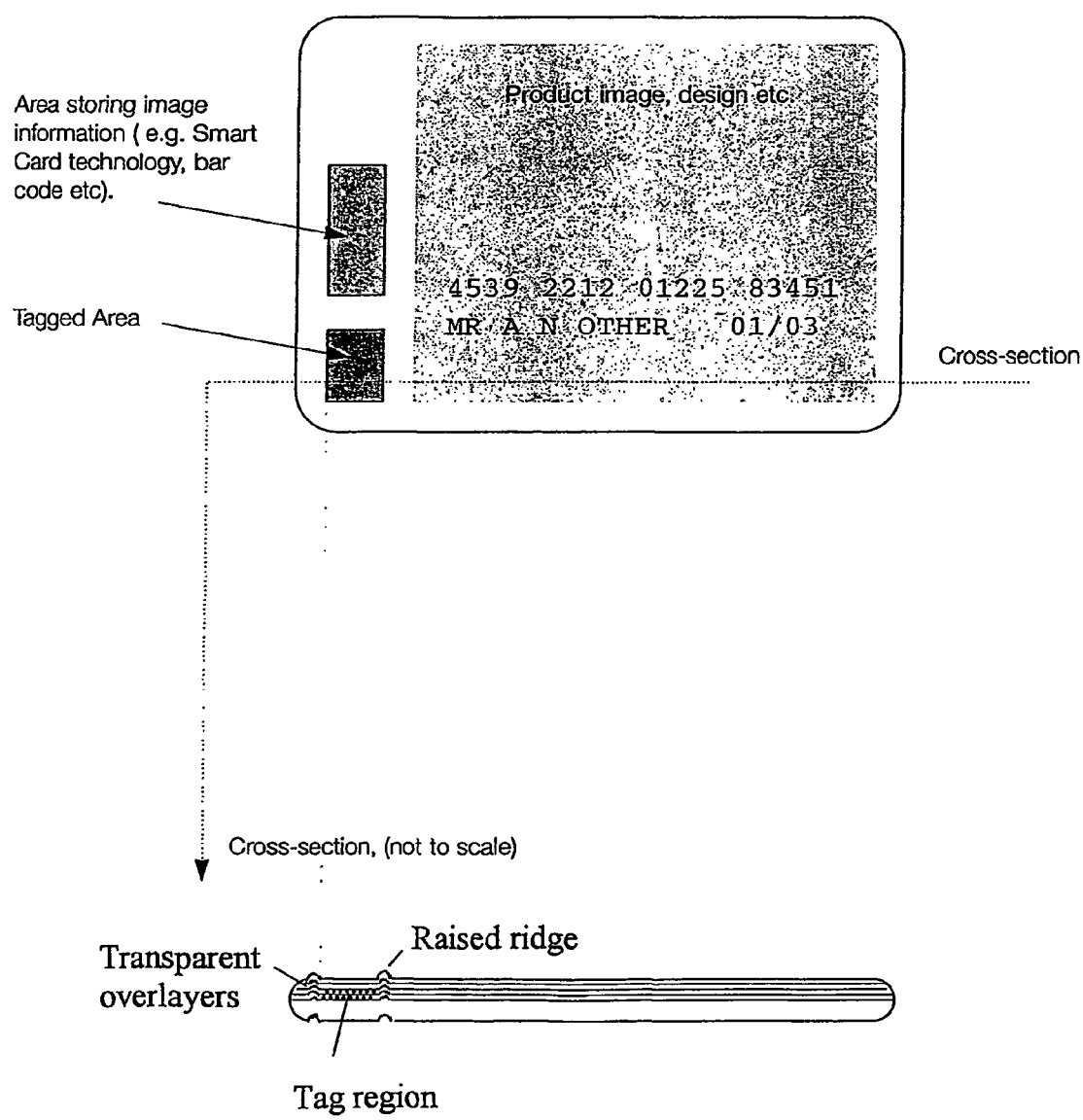
FIG. 17 shows the use of a tag on a credit card, ticket, document, or other flat object. There is the tag area, another area for storing image information (e.g. via smart card technology, bar code, etc.) and possibly other useful information related to the purpose of the object (e.g. ID of the owner, etc.), with the majority of the surface having other information and images normally associated with the object (e.g. credit card information, seat number and date for ticketing, written information for documents, etc.). Also shown is a cross-section through the tag region of the card. The particles are buried under one or more transparent overlayers. The region that is to be read as the tag may be protected from reader-induced wear and tear, scratches, etc., by having a raised ridge around it. This may be created by the stamping process used to 'print' information on cards or by another mechanism.
Figure 19:
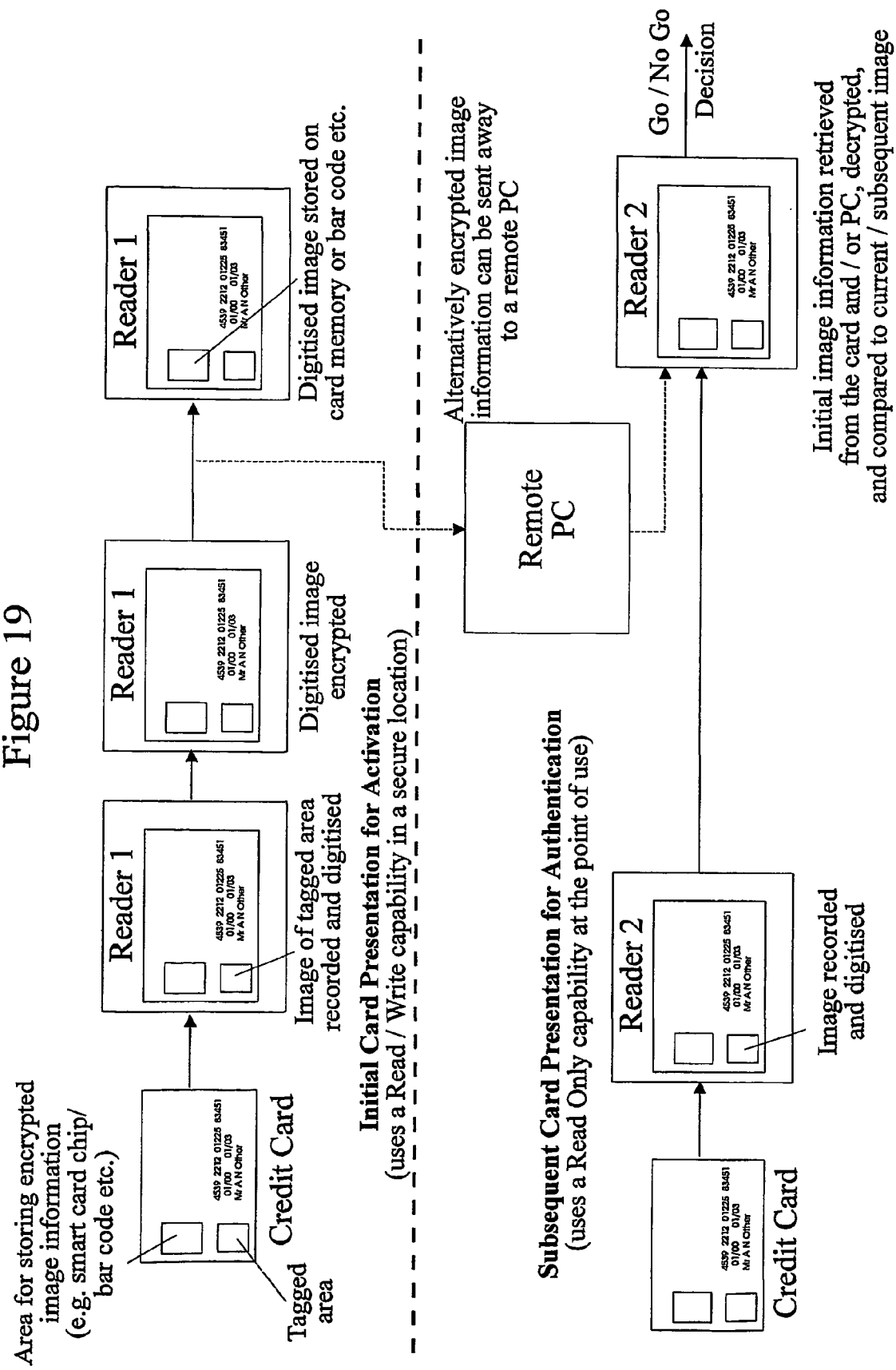
FIG. 19 illustrates the process sequence for the application of a tag to a credit card, or other flat object. The process is initiated by placing the tagged card in the reader, whereupon the image is recorded and digitised, encrypted, and stored in the memory on the object itself (via smart technology, bar code, etc.) and/or transmitted to a remote PC, etc. When the card is 'read' at a subsequent time, such as when authentication is required, for example, when using it in an ATM or sports venue turnstile, the image is again recorded and digitised, the encrypted image information recalled and decrypted, and the two images compared and correlated etc. Depending on the application and degree of security required and consequences of false rejection, the degree of match determines a go/no-go decision.
Figure 22:
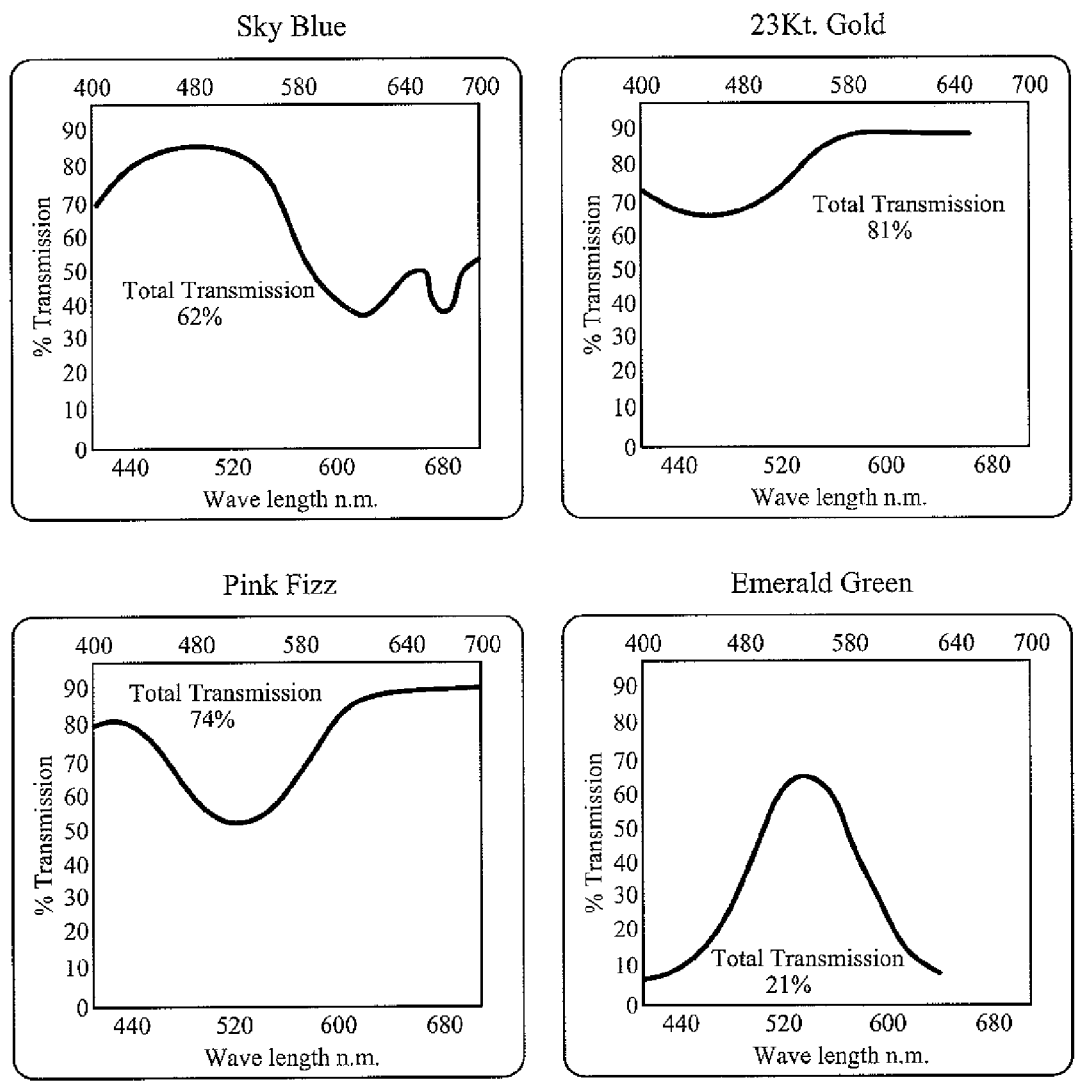

Patterns can be second surface microembossed in order to ensure a smooth top surface for compatibility with conventional printing and die cutting systems including the thermal type. FIG. 22 shows examples of optical transmission curves, as a function of wavelength. The manufacturers state that the holographic patterns are created via a photographic process whereas diffraction patterns are made mechanically using a diamond stylus. Both processes produce bright distinct images but holographic images tend to visually dissolve at certain angles. The latter property is very useful since the detected pattern will vary according to the angle of the particles in the tag. This property will make forgery even more difficult (i.e. the material can be duplicated quite easily, but once it is cut up and dispersed at different locations, depths, angles and orientations in the tag, the tags will become extremely difficult to duplicate—particularly in volume).

The effects of the particles on the light detected depends on:
a) the geometry of the light source(s) to the particles to the detector(s),
b) the structure of the particles (patterns produced in layers, thicknesses and variation of thicknesses across layers, types of layers including air layers, refractive index, reflectivity of layers and interfaces),
c) colour of light source and layers,
d) mixing of types and colours of particles, etc.

In general, the thicker the optically transparent layer, the tighter the angles of the effects. The angle, wavelength, phase, and amplitude of the incident light play a significant role, particularly with respect to destructive interference. Note that, for the holographic' effect to work at its best, none of the layers must diffuse the light significantly. However, in some applications, this effect may be introduced deliberately over some areas of a card or tag to add complexity against forgery.

The use of different coloured light sources (including infra-red) may be introduced to add complexity to the image (and hence to increase the difficulty of forgery) and/or to enhance the light signal from the particles with respect to that from the substrate and general background (i.e. to improve the optical signal to noise ratio). Colour variations may also be introduced by filters, colours within the tag and product, etc.

For example, the initial colourless transparent carrier material from which the tag is to be made could be mixed during bulk production with similar or different materials which have red or green or blue colours. The result will be a carrier throughout which are dispersed heterogeneously and at random minute areas of primary colour. Light reaching the particles and leaving them will thus be subject to these randomly located and randomly coloured filters. A similar effect may be achieved by spraying fine droplets of red, green, and blue dyes, paints, etc., over the surface of the tag prior to encapsulation.

Different coloured light sources could fire off together or in a programmed sequence, or some combination thereof. By using appropriate software, a microprocessor or similar device could allow the different images from the sequence to interact in a prearranged manner so as to obtain the final 'signature' for the tag. For example, the processor could store the result of illumination by white light as pattern 'W', by green light as pattern 'G', and so on. The actual signature of a tag could be pre-defined as (say) the effect of subtracting co-ordinates of particles reflecting just green light (pattern 'G') from the co-ordinates of crystals reflecting white light (pattern 'W'). Other operations such as skewing of one image before subtraction may be used to increase the complexity of the procedure. Such procedures might be of particular interest if a black and white detector is to be used (as opposed to colour). In other words, the above colour effects may be used to add complexity to the intensity variations of the image without the need to actually detect and record the images in colour. Thus, although colour effects may be used, the optical recording device and stored image may be in black and white only.

As another example, the light source may transmit selected wavelengths such that only a subset of wavelengths is detected which depend on the geometry of the source to holographic jewel to detector arrangement. Thus, if only red light is used, only red light will be detected, and a black and white detector is suitable for this. Similar effects may be obtained by having colour filters in front of the source(s) and detector(s), e.g. there may be different filters in from of each light source which is 'fired off' in turn. Whilst the use of a colour CCD may be more powerful (e.g. recording colours in terms of their red, green, and blue components), a black and white CCD may have cost and other benefits.

Note also that the CCD or other recording device may be a linear array which is used to scan vertical and/or horizontal lines, diagonals, etc., the positions of which could be covert (e.g. encrypted). This may be particularly applicable where only a sub-region is recorded.

The holographic material may be created by 'recording' an optical interference pattern that forms at the intersection of two coherent optical beams. The effects thus observed may be the result of any combination of reflection, refraction, diffraction, due to the structure of the material. Thus besides holographic effects, there may be diffraction effects achieved through intricate arrays of interlocking geometric prism patterns. The use of polarised light and polarising filters may also be introduced to add complexity and improve optical signal directly from the particles to background optical 'noise'. Fluorescent or iridescent materials and dichroic glass may also be used, as may photochemical light sources such as zinc sulphide phosphor as the particles, or as part of the particles. This may remove the need for a light source in the reader.

Potential markets are many, varied, and international. Examples are:
1. Forgery-proof bank notes and credit cards.
2. Multi-level access control systems, including ticketing.
3. Access control for portable computers, computer terminals and dangerous machinery.
4. Control of military standard encryption/decryption communication systems.
5. Production/verification of non-forgeable government documents such as visas, driving licences and passports.
6. Identification/protection of sensitive commercial documents such as contracts.
7. Protection from counterfeiting of products such as computer microchips, aircraft spares, medical supplies, and consumer items such as CDs and watches.
8. Identification of valuable items such as production plant, cars, bicycles, etc. so that they cannot be sold legitimately after theft.

Details of specific markets are presented below, as broad examples,:

Bank Notes

Market research shows UK bank notes in circulation at any one time exceed 1.25 billion. A preliminary paper study suggests a 1 $mm^2$ area with 10 μm facets could generate over 4 billion different signatures—which is sufficient to tag each banknote.

Credit Cards

The potential for credit card applications is arguably similar to currency anti-counterfeiting.

Access Control

Often the systems rely on magnetic swipe cards which can be easily copied—unlike the current invention. Included within this field is event ticketing. Access may also be controlled to equipment such as PCs, dangerous machinery, vehicles, etc.

Engineering Spare Parts

The invention may be used to identify genuine products in the aerospace and automotive industries, both OEM and spares.

Three broad ranges of application have been identified, though the invention is not limited thereto. These are:

Plastic
1. Ticketing
2. Banking and Finance (e.g. credit and cash cards)
3. Access control
4. Identification (passports, drivers licenses, DHSS, etc.)
5. Membership cards
6. Gambling materials (e.g. casino chips)

Parts
1. Parts of machines (aircraft, cars, any other specialist machines, e.g. excavators and diggers)
2. Tyres and other safety-critical components
3. Specialist ropes, cables, lines etc. where safety is an issue
4. Weapons in public ownership and military supplies
5. Cars, bikes, boats, jet skis, etc.
6. Pharmaceuticals (particularly packaging)
7. Chemicals
8. Personal Possessions
9. Valuable technical equipment, etc.
10. Precious metals (e.g. bullion)
11. Jewellery, watches, etc.
12. Art and Antiques, 'collectables'
13. Collections
14. CDs (i.e. software), videos, etc.
15. Computers
16. Retail Items (especially clothing, sports and leisure goods, and heavily branded goods such as Star Wars toys, sports clubs' 'Official Replica' kits, etc.)
17. Perfume
18. Authentication of source (e.g. expensive or restricted electronics components, raw materials such as hardwoods, etc., violations of distribution and retail agreements)
19. Hazardous wastes
20. As a separate tag that can be affixed to an object in a manner that removal etc. voids Paper
1. Bank notes
2. Certificates, legal papers, passports, etc.
3. Government and military etc. classified documents
4. Packaging, e.g. drugs, chemicals, CDs, branded products in general, etc.
5. As for all plastic applications above, if technically feasible.

Details of Example Applications

1 Document Protection

Governments, businesses, etc., are concerned about documents being leaked. The application of the invention will not stop them being copied, but it will allow them to be individually identified and logged and will allow for the tracing of unauthorised copies back to the source.

In essence, a device may be provided which is about the size of a desk top printer. The paper is fed in through two rollers, one of which is full width (and just provides tractive power) and the other is segmented. This segmented roller is treated with the type of ink used in a highlighter pen but which contains optical particle fragments. The effect is to transfer onto the page a set of vertical "tiger stripes" which glitter and immediately identify the document as being sensitive.

Having passed through the rollers the document lays on a flat glass screen and its tag identity is read, encoded and printed in the margin using a simple print head. The document may also be scanned using conventional technology and the monochrome output stored in a computer archive.

If the source document were photocopied (even in colour), the copy would not sparkle, and so would be immediately recognisable as a fake.

Additionally, the optical particle elements would show up as a set of black dots on the copy, an effect which would be vital were the copyist to obliterate the source document's registration number when making the illegal copy. The pattern of black dots would be unique to each original document, and this "fingerprint" could be traced back to its source by either comparing the illegal copy with the original or by comparison with the monochrome archive copy.

The machine could also be used to verify that a document was a genuine original and not a fake. The document is fed into the scanner via a second set of rollers, scanned, and the encrypted output compared with the number printed in the margin. If the output and the printed numbers match, then it is genuine—otherwise it is a fake.

Further features of the invention include the following:—
a) embedding the particles in a layer which allows the passage of only selected wavelengths of light.
b) the particles may be arranged at given depths (or specific different levels) or at random depths within the carrier material.
c) the particles may be arranged at different and/or random angular orientations.
d) means may be provided for presenting further information on the device itself. Thus it may store tag (encrypted) image-related information and supplementary information e.g. as in a bank card, etc.
e) the particles may reflect, refract and/or diffract given or specific wavelengths of light, which may depend on the angle of illumination and/or viewing.
f) location (reference) markings may be provided for assisting with the positioning and orientation of the device, e.g. using markers so that the software 're-aligns' the recorded image with reference to the markers for comparison with the stored image data etc.
g) the arrangement may be such that only a sub-set of the image information is stored, this subset being randomly chosen and the position of this sub-set is stored along with the sub-set image information".
h) there may also be several regions with tag areas—the location of which may be covert (i.e. not obvious or visible) and the positions of the ones selected for reading to be stored as encrypted information.
i) a bar code may be used for storing encrypted information of the light pattern recorded from the particles.
j) a memory chip may be used for storing encrypted information of the light pattern obtained from the particles. The term "memory chip" is to be interpreted as including storage devices such as magnetic and bioelectronic devices.
k) protection means may be provided for protecting the reflective particles.
l) the overlayer or formulation medium may be such that it breaks up if tampered with—to provide tamper detection so that tag is secure against transfer. The following is an example of an anti-tampering protection system. It uses a protective cover which comprises two hollow layers, one lying on top of the other. The casing separating the two layers is brittle, and the layers each contain a transparent chemical. If the cover is subjected to twisting or cutting, etc. the middle casing breaks allowing the chemicals to mix. They immediately undergo an irreversible chemical reaction to form an opaque product. This gives a visual warning that tampering has occurred and also prevents the tag being read by the reader.

m) the particles may be such that they reflect and/or refract wavelengths of light invisible to the human eye.

n) the carrier may comprise a liquid or similar fluid state, e.g. an emulsion.

o) the tag may be attractable by a magnet and may, therefore, be attracted by a magnetic force to the reader position. This will be practical only if the carrier is fluid.

p) the particles may be of a size smaller than the resolution of a photocopier.

q) the particles may be deposited by means of one or other of the following processes: spraying, extrusion, ink screen printing, labelling, lamination, coating and the application of an adhesive, mixing, crystal deposition from solution, electrostatics, introducing into a product during manufacture.

r) the tag may be an integral part of the article to which it is applied. Thus it may be attached to the object to be identified (e.g. glued on) or connected to it in some other way (e.g. via a seal, luggage-type tag, etc.). If glued on etc., it may be done in such a way that tampering etc. damages the tag in such a way that it is no longer usable. The tag may be an already occurring feature of the object, such as its grain or fibre structure. In the case of metallic objects, such as machine parts, it may be possible to grind a section of one surface in such a way that its underlying crystalline structure is revealed. This surface, when suitably protected, can act as the tag and its properties will be unique to that individual component.

s) groups of the particles may be located at multiple locations.

t) the particles may be of a specified shape or mixture of shapes or of irregular shapes. Such use of shapes may be used for pattern recognition purposes (e.g. not treating near-neighbour illuminated regions as random) to add to the level of information and hence security level.

u) the particles may be of a specified size or mixture of sizes. They may also be arranged in a three-dimensional pattern. This could be achieved by using large aggregates of particles rather than discrete individual particles. This may be significant in the printing industry where particles outside specific size ranges—dependent upon the medium—are subject to "clumping".

v) the particles may be of a specified colour or mixture of colours. The colour may be inherent or due to optical effects, such as the "holographic" effect.

w) the reading device, which may be an automatic machine reading device for reading a tag, may comprise a light source (or sources) for directing light onto and/or into the tag, light detector means for detecting reflected (and/or refracted and/or diffracted) light at one or more points, and means for processing a signal generated by the detector, thereby to create an electronic signal for subsequent use in an identification procedure. If the medium of the tag and the object being tagged are transparent (at least in the region of the tag) then the transmitted pattern may be recorded on the other side(s) (from the light source) of the object.

x) the reading device may include a plurality of photo detectors positioned in a matrix formation and configured to create a binary code signal upon being hit or missed by reflected and/or refracted and/or diffracted light.

y) the reading device may include a CCD camera for reading the reflected and/or refracted and/or diffracted light pattern.

z) means may be provided for illuminating the particles at a plurality of angles. These could be 'fired off' simultaneously or sequentially (which could be dependent on the time it takes the detector(s) to recover between images) so that more than one image is recorded. The illuminating means may be of different wavelengths/colours or be filtered to provide same. A rotating light source(s) may be used to sweep over the tag area to give a "lighthouse" effect. The output could be sampled at specific intervals or taken as a continuous binary stream depending upon the application.

aa) a plurality of detector means may be provided for detecting reflected and/or refracted and/or diffracted light at a plurality of positions.

bb) a plurality of mirrors may be provided for illuminating the particles from a plurality of different angles.

cc) a plurality of prisms may alternatively be provided for illuminating the particles from a plurality of different angles.

dd) a plurality of lenses may also be provided for illuminating the particles from a plurality of different angles.

ee) reflective means (including mirrors, prisms and lenses) may be provided for capturing into the detectors light emitted at different angles from the particles.

ff) one or more optical filters may be provided for filtering source light or reflected light. The filters will be provided for selectively transmitting part of the wavelength spectrum. The filters could be somewhere in the illuminating path, within the tag, or in the detection path. Polarisation of the light may be used to enhance the ratio of signal (light from particles) to background (light from host material). The tag may include a layer which allows the transmission only of radiation of selected angles of polarisation and specific polarisations of light, i.e. it has filter properties. Particles may be included which reflect specific polarisations of light. As a further example, shining polarised light through a crystalline film yields different coloured patterns if polarising filters set above and below the crystalline film are rotated with respect to each other. Hence, if the tag had a "floor" made of a reflective material and was illuminated with light from a polarising filter, then rotating a second polarising filter placed between the tag and the reader's sensor would yield different colours as the angle of filtration is changed.

gg) storage means will preferably be provided for storing encrypted information on the position of the illuminated pixels.

hh) a tag reader may be used in which the results of scanning with light of wavelength "A" (or from position "A") are used to mathematically manipulate the results of scanning with light of wavelength "B" (or from position "B"); this product ("A"+"B") may then be used to manipulate the result of using light of wavelength "C" (or from position "C"), and so on.

ii) the carrier material of the tag may contain a random distribution of coloured filters of regular (or irregular) shape.
jj) the tag may have a (protective) coating which contains a random distribution of coloured filters of regular (or irregular) shape.
kk) the tag may include a random pattern within a given regular pattern or a regular pattern within a random pattern.
ll) the particles used in the tag may be a mixture of reflective particles and wavelength filtration particles, with the properties of the two particle types being pre-selected so that they complement each other.
mm) the following 'manufacturing' sequence may be followed:

The particles are selected from any of the possible combinations of characteristics.

They are mixed to provide a fairly random mix.

They are applied directly, or via a medium, into the manufacturing process in as random a way as is practical.

The crystals may be protected physically.

To activate the system, the tag area is presented to the reader by the supplier, etc., the tag area is illuminated and an image is recorded. The nature and resolution of the recording system will be tailored to each application.

The image is stored on a PC or other processing device (which can be a stand-alone device, a networked device, or a portable device) and possibly via some sort of hard storage device such as film, via printing, etc.

The image is a pixel-by-pixel (x-y) array of intensities (e.g. grey scale) or colours and brightnesses.

If a black and white version is used, a brightness threshold is set—above this is digital 1, below it zero.

Starting from a fixed position (e.g. the top left corner), the x-y positions of the first 'n' illuminated pixels are recorded.

These co-ordinates are then encrypted and the encrypted co-ordinate information is stored. Supplementary information such as address of cardholder etc. may also be stored as an additional benefit. Alternatively, where the system is to be used in an entirely self-contained application (e.g. high-level access control), the image may be stored instead on a central computer on-site or via electronic link.

When the tag is to be use in the field to demonstrate a genuine article, etc. the card is put into a different but nominally identical optically designed reader, the image is recorded, the encrypted co-ordinates decrypted, and the PC etc. then searches for illuminated pixels. Allowance is made for distortion of the image due to reader tolerance effects or distortions of the tag due to use, etc., and fuzzy matching and other intelligent matching methods used.

The degree of matching between the encrypted co-ordinates and the ones that agree in the image recorded at the point of use decides on pass/fail. For low-level security (sports tickets) this could be quite low (10%), and for high-level security much higher (80%). This is down to the decision threshold on false positives and false negatives, time allowed for reading, and consequences of errors. This process only proves that the tag is genuine, it does not generally identify which tag it is, unless one refers to a central database—which may be the case in certain applications. However, the tag can be uniquely identified if the public key used to unlock an encrypted signature is related by some appropriate mathematical function to the ID assigned by the manufacturer to the tag. For example, let us assume that the public key for a tag is "64"; then, if the appropriate function is "square root public key", the ID of the tag will be "8". A disadvantage of this arrangement is that each tag has to be provided with an individual public/private key pair which, in turn, means that it could be difficult to manufacture tags in bulk. In bulk production, each tag typically uses the same public and private key pair—which is perfectly safe because each tag still has a unique particle structure, and the private key for the group is held securely by the tag manufacturer.

The statistics have been calculated of randomly having two tags the same and an estimation obtained of the difficulty of deliberately forging. This is summarised in the following:

Statistical Considerations

Summary

S1. Number of Unique Tags

The basic idea in constructing a tag is that a number of objects, which can be taken to be discs of approximate diameter 0.5 mm., are placed onto a tag of approximate size 18 mm×14 mm (the area viewed currently by the CCD lens).

The first fundamental problem is to obtain some estimate of the number of unique tags which can be constructed. At the very simplest level this is going to depend upon:

the number of discs that are placed (on average) on/in each tag;

the resolution of the location system for the placed discs, which gives us the number of places on the tag where we can consider a disc to be placed;

the strategy for detecting discs on tags will also affect the number of distinguishable tags that can be made.

Assuming a resolution for the image of the tag to be 640×480 pixels (i.e. the current CCD system) the discs will cover approximately a 16×16 pixel region which effectively gives 40×30=1200 possible locations for each disc. Using n discs and thinking in terms of the positions of the discs, $$\text{the number of unique tags for } n \text{ discs} = \frac{1200^n}{n!}$$

and, for example, considering 50 discs, we have $$\text{Number of unique tags for 50 discs} = \frac{1200^{50}}{50!}$$
$$= \frac{9 \times 10^{153}}{50!}$$
$$= 3 \times 10^{89}$$

which is a very large number. By way of comparison, the number of unique tickets in the British National Lottery is only 13,983,816.

However, in practice it is unlikely that the detection method is likely to be able to determine precise positions of all of the discs and overlapping or near overlapping discs may only be detected as a single item. Consequently, a more useful practical measure may be obtained by thinking about the number of ways of putting n objects down onto a grid of 1200 cells such that no two objects are in the same cell (by reducing the number of cells and so increasing the effective size of the discs would allow us to ensure some separation between the discs).

The number of ways of doing this is $$\binom{1200}{n} \approx \left(\frac{1200}{n}\right)^n.$$

For n=50, this is equal to $1 \times 10^{69}$, still a very large number. In fact the number of ways, and thus the number of tags, is maximised by taking $$n = \frac{1200}{e} \approx 441$$

resulting in an astronomical number of tags.

However, this assumes that the discs are detectable as distinct objects on the 1200 cell grid. Assuming an even lower resolution, we may think about placing n objects on a grid of size M and, by making the grid size smaller, the actual detectable discs will be physically separated. Using an argument as above, the number of ways of doing this is $$\binom{M}{n} \approx \left(\frac{M}{n}\right)^n,$$

which is maximised by taking $$n = \frac{M}{e}.$$

For illustration, n=50 is optimal for M=136, approximately a 12×12 resolution grid, and this results in $5 \times 10^{21}$ unique tags.

Conclusion: However we think about the accuracy of detection and matching, by placing a suitable number of discs on each tag, we can ensure that there are a very large number of unique tags.

S2. The Effect of Fuzzy Matching

In practice we are not going to have perfect detection of each disc's position and the strategy of reading tags may involve only checking certain positions for which data is stored on the encrypted chip (e.g. via a smart card). Imperfect detection implies that there will be a chance of detecting a disc when one is not present (false positive) and failing to detect one when it is present (false negative). Standard statistical theory (using ideas from clinical diagnosis or quality inspection) can be applied to this problem and operating characteristics can be determined for any decision rule of accepting or rejecting the tag. By a suitable choice of rule we can ensure that the probability of accepting a forged card is very small while at the same time the probability of accepting a valid card is very large (near 1).

Conclusion: It is possible to devise a procedure to discriminate reliably between valid cards and simple forgeries (randomly placed discs) on the basis of the presence and absence of discs at certain places on the tag (stored on the encrypted chip). However, such a procedure would be useless if it were possible to produce forgeries with discs in the same (correct) places as the valid tag.

S3. Attribute Matching

Rather than simply looking at the presence and absence of discs at certain positions, a more reliable checking system will be to inspect certain points, where a disc should be present, for various attributes of the disc, such as colour under several different angles of illumination and/or detection.

If we look at J different independent attributes at each matching point and suppose that the jth attribute has $c_j$ levels, then the probability of a match at a single point for a randomly placed disc (as in a possible forgery) is $$p = \prod_{j=1}^{J} \left\{\frac{1}{c_j}\right\} \approx \frac{1}{c^J}, \quad \text{if } c_j \approx c \text{ for all } j.$$

This makes clear the effect of considering a large number of attributes and the exchangeability between the number of attributes examined and the number of levels used. For example, for 3 attributes each with 4 levels the probability of a match by chance is 0.015625. Reducing the number of levels for an individual attribute will reduce the chance of imperfect matching with a valid card and improve the robustness of the validation procedure.

Again, operating rules, taking account of imperfect detection and partial matching, can be devised to ensure that the probability of accepting a forged card is very small while at the same time the probability of rejecting a valid card is also very small. These characteristics of these rules can be studied using elementary probability arguments and optimal settings can be determined for each market application.

Conclusion: By using a suitable number of matching points and attributes it will be possible to create an effectively non-forgeable system, provided that there is no mechanism for placing the discs on a forged tag in precisely the same way as on the valid tag. If these are placed at random in the manufacturing process, even if the forger is able to reproduce the positions of the discs, it is difficult to imagine that they will be able to reproduce the attributes as these depend upon properties of the individual disc and its alignment. Simple calculations show that ignoring these, effectively having random attributes, the chance of producing a valid forgery is extremely small.

S4. General Observations

By placing a suitable number of discs on each tag we can ensure that there are a very large number of unique tags.

It is possible to devise a procedure to discriminate reliably between valid cards and simple forgeries (randomly placed discs) on the basis of the presence and absence of discs at certain places on the tag (stored on the encrypted chip). However, such a procedure would be useless if it were possible to produce forgeries with discs in the same (correct) places as the valid tag.

It is considered that the most secure system is likely to come from matching on well defined attributes, e.g. colour, effect of different incident light sources, etc.

Care needs to be taken in choosing the matching points—they really need to give independent information to reduce the probability of matching by chance (independence allows us the multiply the probabilities of matching on each attribute giving a very small overall probability for a perfect match on all attributes).

Using several points on the same disc will not provide so much useful information.

Use of matching points inside a randomly selected (and encrypted) window of the tag will give some security against cracking the encryption used to store the information on the chip. The relevant information is "hidden" in the tag in an arbitrary manner.

With suitable experimental data it will be possible to analyse any procedure for the probabilities of rejecting a valid card and accepting a forgery.

More Detailed Considerations

The following sections provide more detailed background to the points presented above.

1. Presence/Absence Nce Matching

The basic idea is that a number of objects, which can be taken to be discs of approximate diameter 0.5 mm, are placed onto a tag of approximate size 18 mm×14 mm. A digital image of the tag is then captured using a resolution of 640×480 pixels.

On the basis of this, some very simple calculations can be made:

$$\text{Area of pixel} = \frac{14}{480} \times \frac{18}{640} \approx 0.029 \times 0.028 = 8 \times 10^{-4}$$

$$\text{Area of discs} = \frac{\pi d^2}{4} = \frac{\pi}{16} \approx 0.2 = 2000 \times 10^{-4} \approx 250 \text{ pixels}$$

So a disc can be thought of as approximately covering a 16×16 pixel region.

If we now consider locating the discs on the 640×480 grid, the simplest notion is to define the disc's position by its central co-ordinate. So, for any given disc, there are 640× 480 positions, giving 307200≈3×10⁵ locations. If we now consider placing n discs on the tag, we have No of positions for n discs=$(3 \times 10^5)^n$ And, for example, with 50 discs we have No. of positions for 50 discs
=$(3 \times 10^5)^{50} = 3^{50} \times 10^{250} = 7 \times 10^{23} \times 10^{250} = 7 \times 10^{273}$ This ignores the size of the discs and any element of uncertainty or fuzzy matching. If, instead, we assume that the disc is only located on one of the pixels which it covers, this is very nearly equivalent to using a reduced resolution of $$\frac{640}{16} \times \frac{480}{16} = 40 \times 30$$

giving 1200 possible located positions for each disc.

Again, using 50 discs we have

No of positions for 50 discs=$(1.2 \times 10^3)^{50} \approx 9 \times 10^{153}$

This gives some idea of the number of "unique" tags, at least in terms of the position of the discs.

$$\text{No of unique tags 50 discs} = \frac{9 \times 10^{153}}{50!} = 3 \times 10^{89}$$

So very simple naive measure of a forgery matching a valid card is the probability that a random allocation of 50 discs would all be in the correct position.

$$\text{Probability of a random match} = \frac{1}{3 \times 10^{89}} = 3 \times 10^{-90}$$

This is of course very small! Note that the probability of winning the British National Lottery is 1 in 13,983,816 or $7 \times 10^{-8}$.

If we restrict the situation to ignore potential overlapping of the discs and have 50 distinct items, this probability of a random match is reduced to 1 in $$\binom{1200}{50},$$

or approximately $$\left(\frac{50}{1200}\right)^{50} \approx 1 \times 10^{-69},$$

still a very small number.

These arguments also suppose that the forgery will reproduce exactly the correct number of discs, which in practice may be rather difficult.

However, even just considering the presence or absence of discs, these arguments are ignoring two important aspects of the implementation of the tag reading:

The decision rule for a valid ticket will not demand a perfect match, but rather some certain specified level of agreement.

We will only check the status of certain positions for which data is stored on the encrypted chip.

The second point implies that what matters is not the number of discs that are on a tag, but rather the number of positions that are checked. Hence, we need to know the probability of the forgery being correct at each of the checked positions and the above arguments would apply by using n as the number of checked positions rather than the number of discs. However, there would need to be some independence in these matching points and this would most easily be obtained by making sure that each point corresponds to checking a different disc—pixels corresponding to the same disc are going to have strong spatial correlation, which would invalidate the independence type assumptions used in the above calculations. It is this independence, leading to the multiplication of probabilities, which is giving the very low probabilities of a random match.

Note also, that if the checking positions are only going to relate to where a disc should be and the check is for such a presence, then a very simple forgery would be one which was completely covered in discs—this would trivially match all tags. This is of course easily checked, but notice that forgeries which had more discs than the valid tickets would have increased probabilities of being valid. Because of this type of problem, simply matching by presence or absence is not of much value.

However, ignoring this for the moment, it is instructive to see the effect of imperfect matching rules on the checking of tickets and the detection of forgeries. A simple argument is to consider the status of each pixel. To remove the spatial dependence, resulting from the size of the discs, it is again appropriate to consider the 40×30 grid where the presence of a disc just covers one cell in this grid. If n discs have been laid down, the probability of a given large pixel being covered is n/1200. So, for a random pattern of n discs, the probability of a match at any individual pixel that should be covered is n/1200. If m pixels that should be covered are checked, then the number of matches, X, will approximately follow a binomial distribution with parameters m and n/1200, i.e.

$$X \sim Bin\left(m, \frac{n}{1200}\right).$$

(Strictly one could use hypergeometric sampling distributions, however, the binomial gives a convenient, reasonable approximation and conservative estimates for the probabilities). If we are happy to accept as valid a match with at least a fraction k of the pixels correct, then the probability of an acceptable match for a random pattern is $$Pr\left\{X \geq km \mid X \sim Bin\left(m, \frac{n}{1200}\right)\right\}$$

For typical values of m and n these tail probabilities can be calculated using a normal approximation to the Binomial distribution, i.e.

$$X \sim N\left(\frac{mn}{1200}, \frac{mn(1200-n)}{1200^2}\right).$$

To illustrate this, take m and n both as 50 and k=⅔, then the probability of an acceptable match is $$Pr\left\{X \geq 34 \mid X \sim Bin\left(50, \frac{1}{24}\right)\right\} = Pr\{X \geq 34 \mid X \sim N(2.08, 2)\}$$

which is effectively 0.

As mentioned these arguments depend upon the checking points being independent, which is approximately true if we think of using the "large" pixels. The distribution of X also clearly shows the dependence on n, the number of discs in the pattern to be read (possibly forged). By increasing n we obviously increase the probability of an acceptable match, with the probability going to 1 as n gets large. This clearly invalidates a naïve test based merely on the presence of a disc at the test positions.

b 2. Attribute Matching

The above arguments suggest that what we should be looking at are certain attributes of the disc at the stored matching positions. To consider the probabilities of forgeries passing the test we may assume that the forgery has discs in the same (correct) places as the valid ticket. This assumes an ability to place individual discs in some way at specified points. Unless the actual number of discs on the ticket is checked, the number on the forgery will be irrelevant. All that will matter will be the ability of the forgery process to reproduce the attributes of discs at specified points.

As above, let us assume that we will inspect m points for particular attributes. Initially let us suppose that we are looking simply at colour, say, classified into 3 distinguishable hues (e.g. red, green and blue). Using m points this would give us $3^m$ different possibilities, with, for m=50, a chance of $1.4 \times 10^{-24}$ for a random perfect match. For imperfect matching, we can again use the binomial probability argument and we now have $$X \sim Bin\left(m, \frac{1}{3}\right).$$

Taking k=⅔ and m=51 (for simplicity), we have $$Pr\left\{X \geq 34 \mid X \sim Bin\left(51, \frac{1}{3}\right)\right\} = Pr\left\{X \geq 34 \mid X \sim N\left(17, \frac{17 \times 2}{3}\right)\right\}$$

$$= 1 - \Phi^{-1}\left(\frac{34-17}{\sqrt{\frac{17 \times 2}{3}}}\right)$$

$$= 1 - \Phi^{-1}\left(\sqrt{\frac{51}{2}}\right)$$

$$= 1 - \Phi^{-1}(5.049)$$

$$= 2.867 \times 10^{-6}$$

Now, this is just based on looking at a single 3-level attribute at each of the m points. In general, the probability of an acceptable match from a forgery in which the discs are placed in the correct places, but with no control on the attributes is $$Pr\{X \geq km \mid X \sim Bin(m,p)\}$$

where p is the probability of a match at any individual point. If we look at J different independent attributes at each matching point and suppose that the jth attribute has $c_j$ levels, then $$p = \prod_{j=1}^{J}\left\{\frac{1}{c_j}\right\} \approx \frac{1}{c^J},$$

if $c_j \approx c$ for all j. This makes clear the effect of considering a large number of attributes and the exchangeability between the number of attributes examined and the number of levels used. Reducing the number of levels for an individual attribute will reduce the chance of imperfect matching with a valid card and improve the robustness of the validation procedure. See Tables 1 and 2 for the effect of the number of attributes on p and the probability of an acceptable match for a forgery with random attributes. It is clear that, even with only a moderate value of K, choosing only a few attributes gives good protection against acceptable random matches.

It is also worthwhile considering the probability that a valid card is rejected. Suppose that we assume there is a probability q of each attribute being mis-classified. Then, for a single point, the probability that it will match on all attributes is $(1-q)^J$ and the probability that a valid card will be rejected is $$Pr\{X<km|X\sim Bin(m,(1-q)^J)\}$$

Table 3 shows the probability of matching on all attributes and it is clear that this rapidly gets rather small. Also shown is the effect of allowing a mismatch on one of the attributes as a simple example of partial matching of individual points. Some idea of the probabilities of rejecting a valid card are given in Table 4, where Q refers to the probability of an overall mismatch for a single point. Clearly, to avoid rejecting valid cards we need to ensure that Q is moderately large (probably using partial matching of attributes) and that k is also not too large.

More generally a partial match could be defined as at least q of the J attributes matching and then the decision rule could ask for at least a proportion k of the m points to give partial matches. The effect of this on accepting a forgery is simply to give a larger value of p in the binomial distribution, but this must be offset against a decreased probability of rejecting a valid card. The operating characteristics of this procedure will depend on the misclassification probabilities for the various attributes as seen in Tables 2 and 4.

(Note that the effect of mismatching also slightly reduces the chance of a match for a random attribute, but this is very much a second order effect and can be ignored. More complex misclassification models could also be envisaged, but they are unlikely to have any major effect on the conclusions.)

The above discussion assumes that the same attributes are considered for each matching point—this is not necessary. For example, some of the stored matching points could correspond to positions where there is no disc on the valid card—we would then simply be checking for an incorrectly placed disc in the forgery, which would help counteract some of the problems discussed above and screen out blatantly invalid cards. However, this is just an additional complication, although mixed rules of the form could be considered:

Check $m_1$ points for presence/absence of disc; if less than a fraction $k_1$ correct then check fails, else Check $m_2$ points where discs should be present for attributes; if match better than proportion $k_2$ then ticket is declared valid.

The choice of $m_1, m_2, k_1$ and $k_2$ will define the operating characteristics of the decision procedure and computations could easily be made. One strategy for selecting the points would be to choose the $m_1$ points at random and then select central points of $m_2$ discs for checking the attributes.

3. Comments

We consider that the most secure system is likely to come from matching on well-defined attributes, e.g. colour, effect of different incident light sources, etc.

Care needs to be taken in choosing the matching points—they really need to give independent information for the sorts of argument used above to be approximately valid. Using several points on the same disc will not really provide much useful information.

Use of matching points inside a randomly selected window of the tag will give some security against cracking the encryption used to store the information on the chip.

The relevant information is "hidden" in the tag in an arbitrary manner.

By using a suitable number of matching points and attributes it will be possible to create an effectively non-forgeable system, provided that there is no mechanism for placing the discs on a forged tag in precisely the same way. If these are placed at random in the manufacturing process, the calculations made above will be approximately valid. Even if the forger is able to reproduce the positions of the discs, it is difficult to imagine that they will be able to reproduce the attributes as these depend upon properties of the individual disc and its alignment. The calculations show that, ignoring these, the chance of producing a valid forgery is extremely small.

With suitable experimental data it will also be possible to analyse any procedure for the probability of rejecting a valid card.

The examples used above are for illustration of the statistical considerations for the design of a secure and reliable system. They are indicative rather than definitive attributes of the system.

TABLE 1

Dependence of probability on attributes

| J | c | p |
|---|---|---|
| 1 | 2 | 0.500000 |
| 1 | 3 | 0.333333 |
| 1 | 4 | 0.250000 |
| 1 | 5 | 0.200000 |
| 1 | 6 | 0.166667 |
| 2 | 2 | 0.250000 |
| 2 | 3 | 0.111111 |
| 2 | 4 | 0.062500 |
| 2 | 5 | 0.040000 |
| 2 | 6 | 0.027778 |
| 3 | 2 | 0.125000 |
| 3 | 3 | 0.037037 |
| 3 | 4 | 0.015625 |
| 3 | 5 | 0.008000 |
| 3 | 6 | 0.004630 |
| 4 | 2 | 0.062500 |
| 4 | 3 | 0.012346 |
| 4 | 4 | 0.003906 |
| 4 | 5 | 0.001600 |
| 4 | 6 | 0.000772 |

TABLE 2

Binomial Probabilities of an acceptable random match (m = 50)

| k | 50 k | p = 0.5 | p = 0.33 | p = 0.25 | p = 0.125 |
|---|------|---------|----------|----------|-----------|
| 0.5 | 25 | 0.443862 | 0.004845 | 0.000038 | 0 |
| 0.55 | 27.5 | 0.239944 | 0.000801 | 2.9E-06 | 0 |
| 0.6 | 30 | 0.05946 | 3.05E-05 | 0 | 0 |
| 0.65 | 32.5 | 0.01642 | 2.3E-06 | 0 | 0 |
| 0.7 | 35 | 0.001301 | 0 | 0 | 0 |
| 0.75 | 37.5 | 0.000153 | 0 | 0 | 0 |
| 0.8 | 40 | 0.000003 | 0 | 0 | 0 |
| 0.9 | 45 | 0 | 0 | 0 | 0 |

TABLE 2-continued

Binomial Probabilities of an acceptable random match (m = 50)

| k | 50 k | p = 0.5 | p = 0.33 | p = 0.25 | p = 0.125 |
|---|------|---------|----------|----------|-----------|
| 0.95 | 47.5 | 0 | 0 | 0 | 0 |
| 1 | 50 | 0 | 0 | 0 | 0 |

Note:
In this table the "0"s are not really "0", but rather VERY small numbers.

TABLE 3

Dependence of Probability of Mismatch of a Single Point on the Number of Attributes

| J | q | Pr (all correct) | Pr (at most one error) |
|---|---|------------------|------------------------|
| 1 | 0.2 | 0.800000 | |
| 1 | 0.1 | 0.900000 | |
| 1 | 0.05 | 0.950000 | |
| 1 | 0.01 | 0.990000 | |
| 1 | 0.005 | 0.995000 | |
| 2 | 0.2 | 0.640000 | 0.96 |
| 2 | 0.1 | 0.810000 | 0.99 |
| 2 | 0.05 | 0.902500 | 0.9975 |
| 2 | 0.01 | 0.980100 | 0.9999 |
| 2 | 0.005 | 0.990025 | 0.999975 |
| 3 | 0.2 | 0.512000 | 0.896 |
| 3 | 0.1 | 0.729000 | 0.972 |
| 3 | 0.05 | 0.857375 | 0.99275 |
| 3 | 0.01 | 0.970299 | 0.999702 |
| 3 | 0.005 | 0.985075 | 0.999925 |
| 4 | 0.2 | 0.409600 | 0.8192 |
| 4 | 0.1 | 0.656100 | 0.9477 |
| 4 | 0.05 | 0.814506 | 0.985981 |
| 4 | 0.01 | 0.960596 | 0.999408 |
| 4 | 0.005 | 0.980150 | 0.999851 |

TABLE 4

Binomial Probabilities of rejecting a valid card with overall mismatch probability Q for each point (m = 50)

| k | 50 k | Q = 0.5 | Q = 0.75 | Q = 0.9 | Q = 0.95 | Q = 0.99 |
|---|------|---------|----------|---------|----------|----------|
| 0.5 | 25 | 0.55614 | 0.00012 | 0 | 0 | 0 |
| 0.55 | 27.5 | 0.76006 | 0.00102 | 0 | 0 | 0 |
| 0.6 | 30 | 0.94054 | 0.01392 | 0 | 0 | 0 |
| 0.65 | 32.5 | 0.98358 | 0.05512 | 0 | 0 | 0 |
| 0.7 | 35 | 0.9987 | 0.25192 | 0.00007 | 0 | 0 |
| 0.75 | 37.5 | 0.99985 | 0.48901 | 0.00322 | 0 | 0 |
| 0.8 | 40 | 1 | 0.83632 | 0.02454 | 0.00016 | 0 |
| 0.9 | 45 | 1 | 0.99789 | 0.5688 | 0.10362 | 0.00015 |
| 0.95 | 47.5 | 1 | 0.99991 | 0.96621 | 0.72057 | 0.08944 |

The invention claimed is:

1. A method of operating a security system, said method comprising:
    making a plurality of tags, each of which includes a plurality of particles randomly distributed in a light-transmitting matrix;
    attaching the tags to objects to be authenticated;
    providing a reader which includes means for causing light of one or more wavelengths to impinge on a tag and means for detecting, recording and interpreting the light reflected and/or refracted and/or diffracted by the particles in the matrix so as to produce images of the particles;
    presenting said tags to said reader;
    encrypting and storing information concerning the images of at least some of the particles of a particular tag on at least one of the particular tag and the object to which the particular tag is attached;
    recalling and decrypting the encrypted image information; and
    comparing the recalled and decrypted image information with the image information obtained by the reader when authentication is required.

2. The method as claimed in claim 1, in which the matrix is afforded by an optically transparent medium, wherein making a plurality of tags further comprises mixing the particles with the medium when the medium is in a fluid state, the medium setting after application of the medium containing the particles to a substrate.

3. The method as claimed in claim 2, in which the substrate is photographic paper.

4. The method as claimed in claim 1, in which the matrix is afforded by an optically transparent medium, wherein making a plurality of tags further comprises mixing the particles with the medium when the medium is in a fluid state, the medium setting to form a marker that can be attached to a substrate.

5. The method as claimed in claim 1, in which the particles are selected from a group consisting of metallised plastic foil particles and geological crystals.

6. The method as claimed in claim 1, in which the interpreting means is a computer on which an image of the tag is stored and which includes means for recording co-ordinates of illuminated pixels.

7. The method as claimed in claim 6, which includes the use of a bar code for storing encrypted information concerning the co-ordinates.

8. The method as claimed in claim 6, in which the co-ordinates are encrypted and the encrypted co-ordinate information is stored on a central database.

9. The method as claimed in claim 6, which includes means for manipulating the co-ordinate information.

10. The method of operating a security system as claimed in claim 1, in which the reader includes a plurality of light sources arranged to illuminate the tag at different angles and/or with light of different wavelengths.

11. The method as claimed in claim 1, in which the matrix and/or the particles are inherent in the object being "tagged".

12. The method as claimed in claim 1, in which a plurality of light sources are used to illuminate the tag.

13. The method as claimed in claim 12, in which the light sources are diffractive optical elements.

14. The method as claimed in claim 1, further comprising selecting a required level of security.

* * * * *